US007505998B2

(12) United States Patent
Barrett

(10) Patent No.: US 7,505,998 B2
(45) Date of Patent: Mar. 17, 2009

(54) APPARATUSES AND METHODS FOR DYNAMIC CREATION OF PHASE GANTT CHARTS

(75) Inventor: Kevin R. Barrett, Houston, TX (US)

(73) Assignee: Computer Associates Think, Inc., Islandia, NY (US)

( * ) Notice: Subject to any disclaimer, the term of this patent is extended or adjusted under 35 U.S.C. 154(b) by 421 days.

(21) Appl. No.: 10/888,000

(22) Filed: Jul. 9, 2004

(65) Prior Publication Data

US 2005/0160084 A1 Jul. 21, 2005

Related U.S. Application Data

(60) Provisional application No. 60/487,070, filed on Jul. 10, 2003.

(51) Int. Cl.
*G06F 17/00* (2006.01)
*G06T 11/20* (2006.01)

(52) U.S. Cl. ............... 707/104.1; 707/10; 707/101; 707/102; 707/103 X; 345/440

(58) Field of Classification Search .............. 707/3, 707/102, 10, 1, 101, 103 X, 104.1, 103 R; 345/440, 779; 705/1, 7, 9; 718/100; 715/848, 715/835; 455/445
See application file for complete search history.

(56) References Cited

U.S. PATENT DOCUMENTS

| 5,974,391 | A | 10/1999 | Hongawa | 705/7 |
|---|---|---|---|---|
| 6,513,154 | B1 | 1/2003 | Porterfield | 717/101 |
| 6,678,671 | B1 * | 1/2004 | Petrovic et al. | 707/1 |
| 6,900,807 | B1 * | 5/2005 | Liongosari et al. | 345/440 |
| 7,082,605 | B2 * | 7/2006 | Alletson et al. | 718/100 |
| 7,120,879 | B2 * | 10/2006 | Gutberlet et al. | 715/853 |
| 7,257,778 | B2 * | 8/2007 | Kekki et al. | 715/848 |
| 7,353,183 | B1 * | 4/2008 | Musso | 705/9 |
| 2002/0077842 | A1 * | 6/2002 | Charisius et al. | 705/1 |
| 2003/0050065 | A1 * | 3/2003 | Alletson et al. | 455/445 |
| 2003/0067491 | A1 * | 4/2003 | Cadwallader | 345/779 |
| 2003/0067492 | A1 * | 4/2003 | Cadwallader | 345/779 |
| 2003/0097288 | A1 | 5/2003 | Shimomura et al. | 705/8 |
| 2003/0229524 | A1 * | 12/2003 | Reuveni | 705/7 |
| 2004/0119713 | A1 * | 6/2004 | Meyringer | 345/440 |

OTHER PUBLICATIONS

"Project-Management with Gantt-Charts", Openoffice.org. 2.0 Calc, Jan. 3, 2003, pp. 1-21.*
"Create Gantts", Ganttchart.com, Feb. 2003, p. 1.*
Notification of Transmittal of the International Search Report and the Written Opinion of the International Searching Authority for International Application No. PCT/US04/21976, filed Jul. 9, 2004, (7 pages), Oct. 28, 2005.

* cited by examiner

*Primary Examiner*—Thuy N Pardo
(74) *Attorney, Agent, or Firm*—Baker Botts L.L.P.

(57) ABSTRACT

A method for dynamic creation of a phase Gantt chart, includes entering project management data into a repository, receiving a request from at least one client to obtain the project management data and generating the phase Gantt chart in response to the received request based on the project management data stored in the repository.

66 Claims, 26 Drawing Sheets

FIGURE 8

Project Phases > Tasks At Risk     Help

Rollout Phase

- ⊚ Conduct Post Mortem Meeting
- ⊚ Finalize Readme
- ⊚ Complete GA Readiness Checklist
- ⊚ Produce PDFs for printing
- ⊚ RQA Signoff
- ⊚ Complete Support Turnover Specification Doc
- ⊚ Prepare & Submit Copyright filing materials
- ● Prepare & Submit Source Backup
- ⊚ CD Masters to Manufacturing
- ⊚ Product GA (CDs available)

FIGURE 11
4/16/03  5/28/03 

FIGURE 23

CleverPath Project Monitor

(^Planning Phase
- Create Product Requirements Specification
- Review PRS
- Update PRS
- Submit PRS
- Obtain PRS Approval
- Notify Project Team of Project Approval £} Design Phase

FIGURE 24

| | o | Task Name | Duration | Start | Finish | |
|---|---|---|---|---|---|---|
| 1 | ✓ | E Planning Phase | 27.1 day*? | Mon 2/3/03 | Wed 3/12J | ?*m— |
| 2 | ✓ | Create Product Requirt | 10 days? | Mon 2/3/03 | Fri 2/14 | -Zjmmerman |
| 3 | ✓ | Review PRS | E days? | Mon 2/17/03 | Fri 2/21 | tic-Zjrnmermen,Mafie;L.Godfrey.Gregoryfie |
| 4 | ✓ | Update PRS | 5 days?! | Mon2/24/03 | Fri 2/28 | Eric Zimmerman |
| 5 | ✓ | Submit PRS | 1 day?| | Mon 3/3/03 | Mon 3a | Eric Zimmerman |
| 6 | ✓ | Obtain PRS Approval | 0 days?! | Wed3/12/D3; | Wed 3/12 | |
| 7 | ✓ | Natily Project Team of | 0.1 days? | Wed 3/12/03 | Wed 3/12 | |
| 8 | ✓ | E Design Phase | 33 days?! | Wed 3/12/03 | Fri 4/26 | |
| 9 | ✓ | Software Requirerrti | 33 days? | Wed 3/12/03 | Fri 4/26 | |
| 10 | ✓ | Create Software F | 7 days? | Wed 3/12*33 | Thu 3/20 | |
| 11 | ✓ | Review SRS | 2 days? | Fri 3/21 /03 | Mon 3/24 | |

APPARATUSES AND METHODS FOR DYNAMIC CREATION OF PHASE GANTT CHARTS

REFERENCE TO RELATED APPLICATIONS

The present disclosure is based on and claims the benefit of Provisional Application 60/487,070 filed Jul. 10, 2003, the entire contents of which are herein incorporated by reference.

BACKGROUND

1. Technical Field

The present disclosure relates generally to Gantt charts, and more particularly to apparatuses and methods for dynamic creation of phase Gantt charts.

2. Description of the Related Art

Project management involves the application of knowledge, skills, tools and techniques to a broad range of activities, in order to accomplish specific goals for a particular project. For example, project managers may develop a project plan by defining a project's goals and objectives, specifying the tasks required to achieve those goals and objectives, allocating the necessary resources, and doing all of the above within an allocated budget in a specified amount of time.

One of the challenges a project manager may face is accurately identifying the tasks that are necessary in order to complete a project on time and within a budget. For example, Chief Information Officers (CIOs) are senior executives in an organization responsible for all aspects of the organizations' information technology (IT) and computer systems and line of business managers are executives that are responsible for the performance of their business units. These executives, among others, may need to understand the whole landscape of their IT organization, from human resources availability, to the processes implemented and followed, projects and technology employed, and budgeting and time constraints allowed, while being able to communicate all of the above information with upper management in a concise and easy fashion.

A method of illustration for accomplishing the above goals may be through the use of graphs and charts. Many different types of charts may be used in practice, often depending on the size and complexity of a project. For example, a Gantt chart is a horizontal bar chart developed as a production tool in 1917 by Henry L. Gantt. A Gantt chart graphically displays the time relationships between the different tasks in a project, a tool that helps a project manager plan, coordinate and track specific tasks for a given project.

Gantt charts may illustrate a project's status by using a horizontal axis that represents the total time span of the project, broken down into increments and a vertical axis that represents the tasks that make up the project. Also provided, are horizontal bars of varying lengths that represent the sequences, timing and time span for each task. It may be noted that the time spans of each horizontal bar may overlap. As the project progresses, darkened bars or arrowheads may be used to indicate the completed tasks, or the portions of the tasks that have been completed.

Accordingly, it would be beneficial to have apparatuses and methods for the dynamic creation of phase Gantt charts in order to address the needs of project managers and allow them to make optimum use of time and resources, run projects efficiently and monitor their progress effectively.

SUMMARY

A method for dynamic creation of a phase Gantt chart, comprises entering project management data into a repository, receiving a request from at least one client to obtain the project management data, and generating the phase Gantt chart in response to the received request based on the project management data stored in the repository.

An apparatus for dynamic creation of a phase Gantt chart, comprises a unit for entering project management data into a repository, a unit for receiving a request from at least one client to obtain the project management data, and a unit for generating the phase Gantt chart in response to the received request based on the project management data stored in the repository.

A computer storage medium including computer executable code for dynamic creation of a phase Gantt chart, comprises code for entering project management data into a repository, code for receiving a request from at least one client to obtain the project management data, and code for generating the phase Gantt chart in response to the received request based on the project management data stored in the repository.

BRIEF DESCRIPTION OF THE DRAWINGS

A more complete appreciation of the present disclosure and many of the attendant advantages thereof may be readily obtained as the same becomes better understood by reference to the following detailed description when considered in connection with the accompanying drawings, wherein:

FIG. 8 shows an HTML output page generated by the AtRiskTaskStatus servlet from a user's perspective, according to an-embodiment of the present disclosure;

FIG. 11 shows an image, according to an embodiment of the present disclosure;

FIG. 23 shows a graphical user interface illustrating a hierarchal tree structure, according to an embodiment of the present disclosure;

FIG. 24 shows a graphical user interface illustrating a gantt bar chart, according to an embodiment of the present disclosure;

DETAILED DESCRIPTION

This application provides tools (in the form of methodologies, apparatuses, and systems) for dynamic creation of phase Gantt charts. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
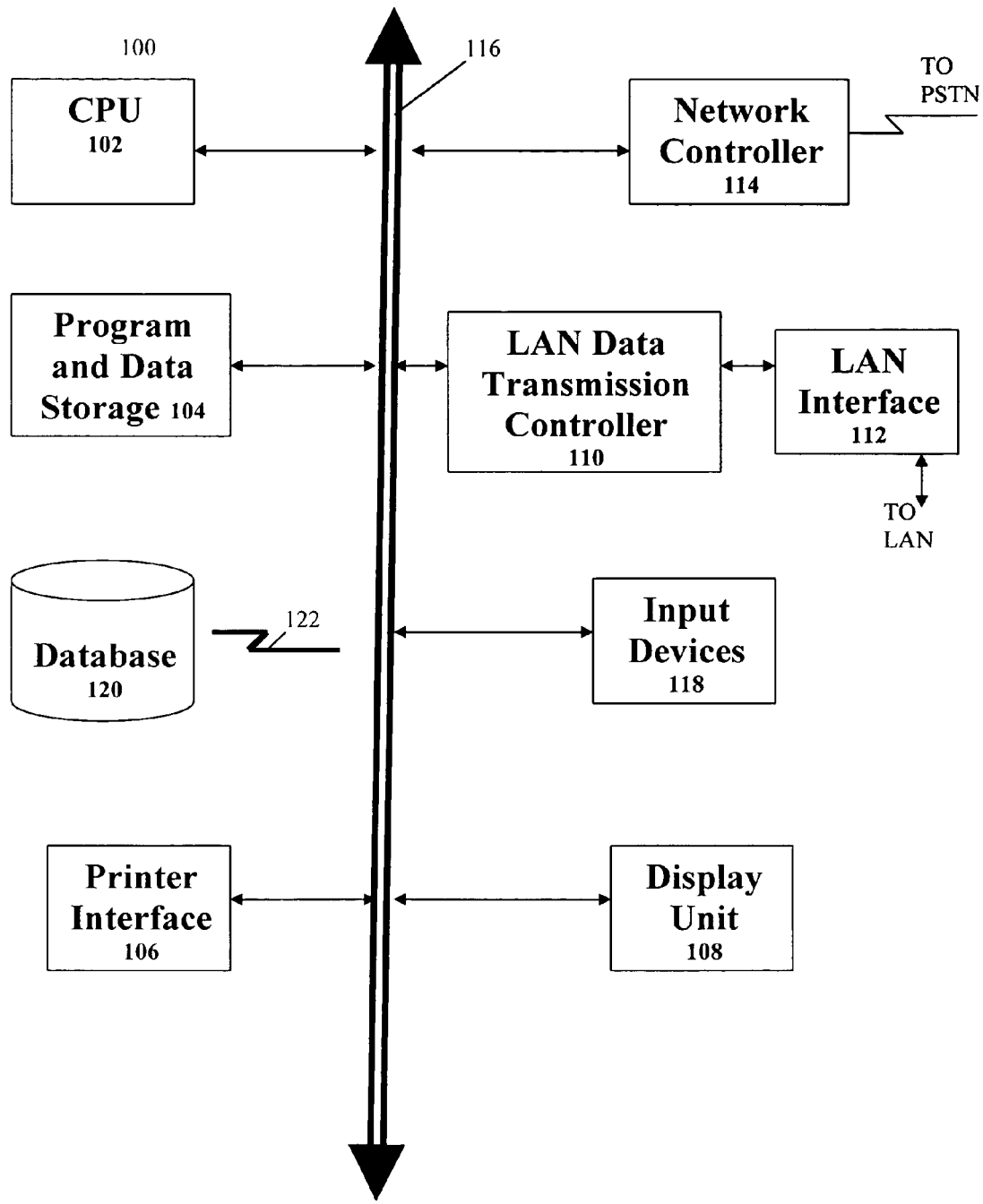
FIG. 1 shows a block diagram of an exemplary computer system capable of implementing the method and system of the present disclosure.

FIG. 1 shows an example of a computer system 100 which may implement the method and apparatus of the present disclosure. The apparatus and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 may include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The embodiments of the present disclosure provide a software product that implements web based project management by providing live reporting based on distilled project information to different users in an organization. Each of the different users, for example, executive managers, project managers, and team members, may utilize the software product to meet their individual needs. For example, a project manager may want to enter specific information for each of the projects and may do this by utilizing a client-based software application. A project manager may check-in an active project that already has resources assigned and create new resources that don't already exist within the database. In a single step, a project may be moved from the client based product into and out of a database repository. On the other hand, an executive manager may want to check the status of a project (based on the information the project manager enters) and may do this by utilizing a web browser.

Figure 2:
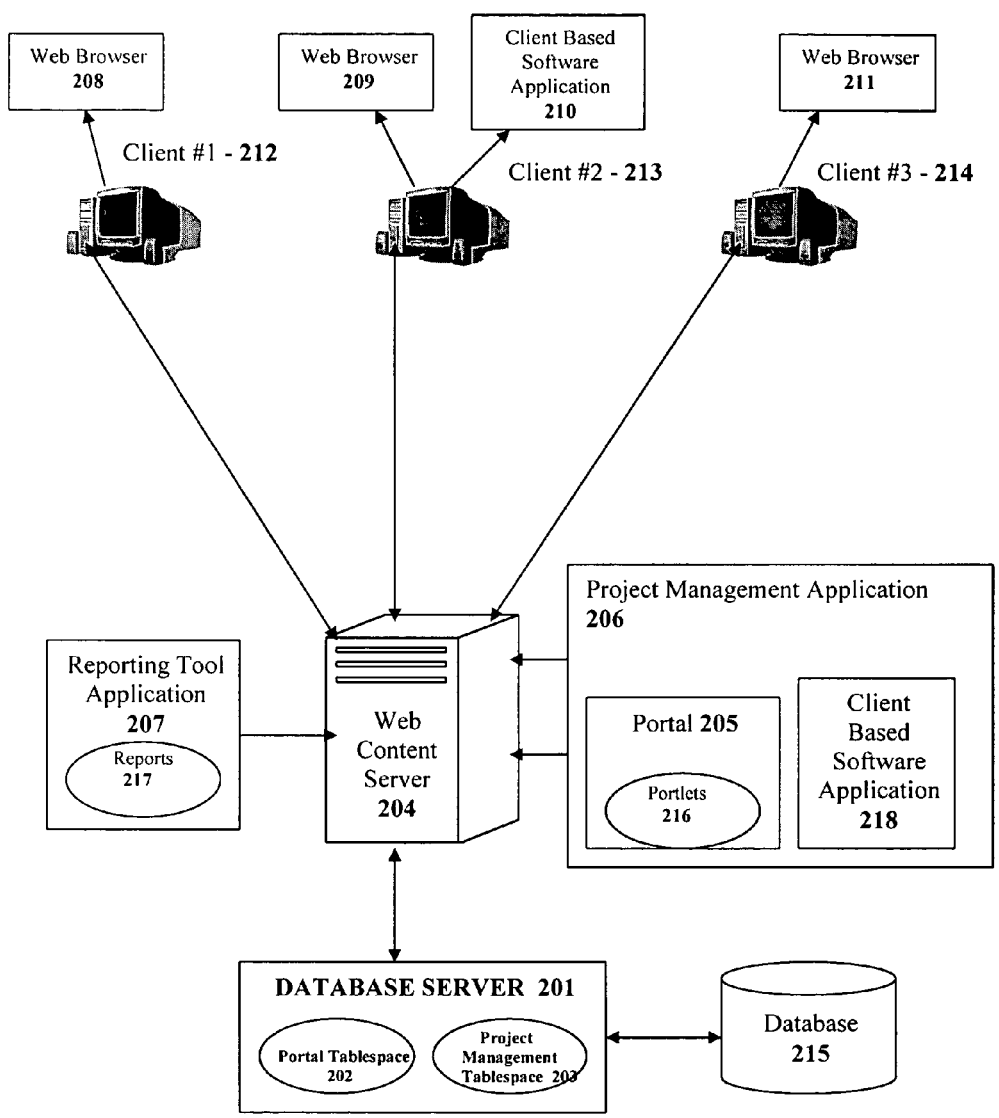
FIG. 2 shows a system for the dynamic creation of phase Gantt charts, according to an embodiment of the present disclosure.

A more detailed description of an embodiment of the present disclosure for the dynamic creation of phase Gantt charts, will be described with reference to FIG. 2. Clients 212, 213, 214 may perform a number of administration tasks and reporting by interacting with a web content server 204 through a portal application 205 that may display a variety of portlets 216. Client(s) as referred to herein may include(s) individual computers, phones, PDAs, etc. Both project management application 206 and reporting tool application 207 may reside on web content server 204. Project management application 206 may include the portal content 205, 216 and the client-based software application 218. A database server 201 may contain both portal tablespace 202, where portal client information may reside and project management tablespace 203, where project resource data may reside. Projects and project-related data may be entered and retrieved from a database 215 through a client-based product 210. For example, client #1 212 and client #3 214 may be an executive manager and a team member, respectively, performing product specific tasks and reporting by interacting with the web content server 204 through their web browsers 208, 211, respectively. Client #2 213 may be a project manager, entering and retrieving project and project related data from the database 215 through a client based software application 210.

For the purposes of understanding the present disclosure, embodiments of the present disclosure may be divided into a number of areas, each of which may be discussed in detail below.

Server

Users may configure as many servers as their licensing permits. According to an embodiment of the present disclosure, as illustrated in FIG. 2, a web content server 204 may execute a plurality of software applications, such as a portal application 205, a project management application 206, a reporting tool application 207, etc. The portal application 205 may contain a number of portlets 216 that allow a user to perform product specific administration tasks and reporting.

The reporting tool application may allow users to generate project management reports. A database server 201 may contain both portal tablespace 202, where portal user information may reside and project management tablespace 203, where project resource data may reside.

According to another embodiment of the present disclosure, a single server may be designated for the database (including portal and project management tablespace), portal and portlets for systems with less than 500 users, for example.

According to another embodiment, multiple different servers may be used, one or more for the database (including portal and project management tablespace), one or more for the portal, and one or more for the portlets, etc.

According to yet another embodiment, in systems with a large number of users (for example, 1000 plus users and unlimited project managers), one server may be designated for any portal supported database (including portal tablespace), another server may be designated for the database (including project management tablespace), and a third server may be designated for the portal and portlets. In this embodiment, for every twenty new project managers a new portlet server may be used in order to successfully handle the load of projects being checked into and out of the database.

According to an embodiment of the present disclosure, the database 215 may store at least ten thousand resource entities and two thousand projects and supports a "Check-In/Check-Out" (CICO) feature, where projects may be moved from the client based software application 210 into and out of the database 215. At least 20 simultaneous project check-ins and project check-outs using projects ranging from 200 tasks to 1,000 tasks may be supported. Assuming each project is a new project (one that does not already exist in the database) the system may be arranged such that the check-in response time for each project may not exceed five minutes (per project) and the check-out response time for each project may also not exceed five minutes (per project).

In a single installation the following components may be delivered as one package to the server with minimum user interaction: portal, reporting tool application run time engine, reporting tool application development environment, project management portlets, client software application's Install image, and a set of database scripts. According to another embodiment of the present disclosure, a user may have the ability to select the components desired for installation.

A client, such as a project manager, who wishes to create projects, may run the client software application's Install image from the server.

If a previous installation of a portal is detected, the project management application may be installed to the existing portal. A portal template may be provided as part of the portal installation for use with the project management application. This template may contain the following workplaces: administrative, project management, and team member.

An un-install functionality may also be provided, where all components are removed, except for user-modified content, help files, portal tablespace, or the project management tablespace.

Project Management Application

This application may consist of both the portal content and the client-based software application. Each will be discussed in further detail below.

Portal & Project Management Portlets

A portal, according to an embodiment of the present disclosure, is a specialized web application that may provide organizations with the ability to manage and organize information, providing a single point of access to applications and information. It may serve as a single interface to applications and information and may provide a personalized view of that information to each user.

A portal page may represent a complete document including multiple portlet components, giving users access to different information and tools in a single place. A portlet is a component of a portal that generates dynamic content and is designed to be aggregated in the larger context of a portal page. Each user may customize their view of the portal by adding the portlets that they want to add to change the look and feel of their pages.

Figure 3:
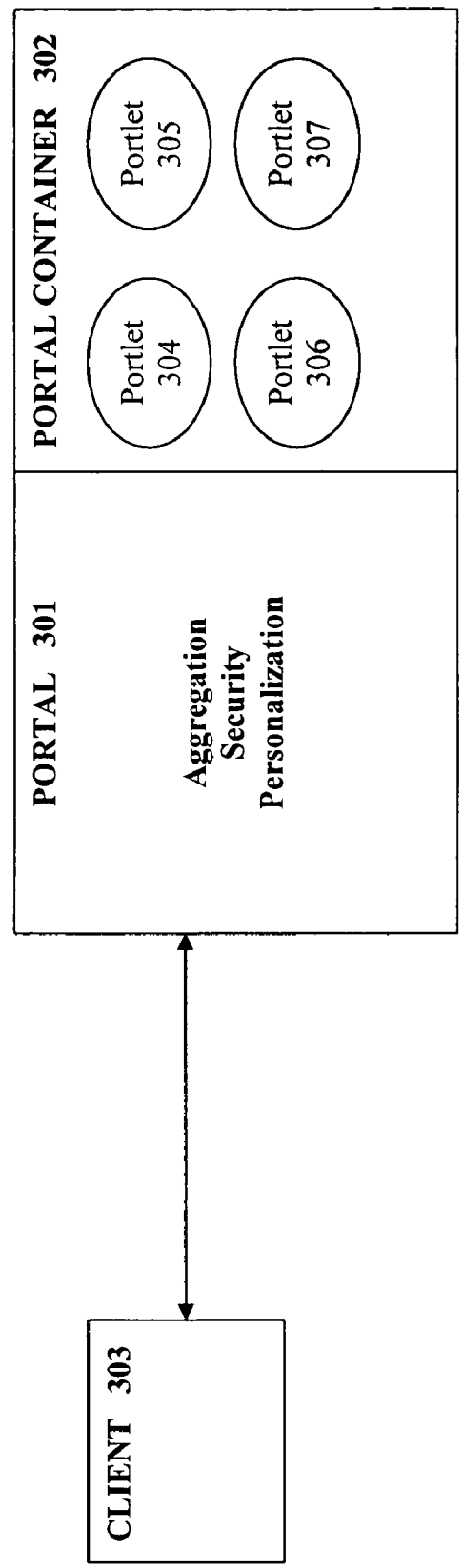
FIG. 3 shows a flow chart illustrating the relationship between the portal and the project management portlets, according to an embodiment of the present disclosure.

FIG. 3 is a flow chart illustrating the relationship between the portal and the project management portlets, according to an embodiment of the present disclosure. A number of different project management portlets 304, 305, 306, 307 may be aggregated into portal 301, each containing links, actions and content suitable for aggregation within portal 301. Security to the various project management portlets 304, 305, 306, 307 may be controlled by portal 301. A portlet container 302 may be provided to run the project management portlets 304, 305, 306, 307 by receiving requests from portal 301 to execute requests on the portlets.

Each of the following portlets will be described in further detail below: Create Resource Portlet, Resource Search Portlet, View Resource Portlet, Edit Resource Portlet, Delete Resource Portlet, Project Search Portlet, Delete Project Portlet, View Project Portlet, Unlock Project Portlet, Project Management Gantt List Portlet, Project Phases Portlet, Tasks At Risk Portlet, Task Status Portlet, Tolerance Settings Portlet, Resource List Portlet, Team Member To Do List Portlet, Task Details Portlet, Resource List Portlet, etc.

Create Resource Portlet

The Create Resource portlet may allow a user to create resources. The portlet provides a "create resource" screen to the user with the following fields: Resource Name, Login ID, Availability Date, Manager, Termination Date, Add to Managers List (i.e., if the resource considered a manger), etc. The Resource Name, Login ID, and Availability Date fields may require the user to enter applicable information. According to an embodiment of the present disclosure, the Availability Date field may be pre-populated with the current date. The Manager field may be a drop down list that the user may select from. The list may contain only those resources marked within the database as a manager and may be displayed in ascending order by name. The word "none" may be the first item displayed within the Add to Manager's List field and may be the default value. All required fields may be marked as such; however, the Manager field does not have to be a required field. All the data fields may display an example date format. The format may be a localized field that displays an example pertinent to the locale. An error may be displayed to users entering a date with a different format than the one shown. All error messages may be returned within the same portal window. According to an embodiment of the present disclosure, if data is entered into the add resource screen prior to an error or a browser refresh, it may be preserved within the interface. A user may save a resource to the database by clicking on a "SAVE" link and may launch help by clicking the HTML "HELP" link.

Resource Search Portlet

The Resource Search portlet may allow a user to search for a resource. The portlet provides a search functionality that may allow a user to search by using any of the following: a Quick List, a Resource Name, a Resource Code (User ID), etc. The Quick List may be a drop down list box containing the following pre-defined sort options: all resources assigned to a particular manager, all resources, etc. The default value for the Quick List is all resources assigned to the particular manager. The Resource Name and Resource Code may be text fields requiring the user to enter the applicable information. A user may execute a search by clicking the HTML link or may launch help by clicking the HTML "HELP" link. The results may be returned within the same portal window and may be displayed as a paged list, where each page may contain a maximum number of resources, for example, ten resources per page. The user may navigate between each page via a set of numbered links positioned at the end of the search results. The total number of results may be displayed at the end of the search results. A user may perform the following actions on each of the resources listed: View a Resource, Edit a Resource, Delete a Resource, View a Resources Timesheet, etc., where each of these actions triggers its own portlet, described below.

View A Resource Portlet

The View Resource portlet may allow a user to view the details of a selected resource. This portlet allows a user to view the following resource attributes: Resource Name, Login ID, Manager, Availability Date, Termination Date, If the Resource is a Manager, etc. The user may launch help by clicking the HTML "HELP" link. From this portlet, a user may navigate and further perform the following actions: Edit a Resource, Delete a Resource, View a Resources Timesheet, etc., where each of these actions triggers its own portlet, described below.

Edit A Resource Portlet

The Edit Resource portlet may allow a user the attributes of any resource selected from the search results. This portlet allows a user to modify the following fields: Resource Name, The Resources Manager, The Availability Date, The Termination Date, Resources is Considered a Manager, etc. The Resource Login ID field may not be allowed to be edited. The user may launch help by clicking the HTML "HELP" link.

According to an embodiment of the present disclosure, the Resource Name field may be approximately eighty characters in length.

Delete A Resource Portlet

The Delete Resource portlet may allow a user to delete a selected resource. This functionality may be available from the Resource Search page. Once the delete link is selected, the resource details may be displayed as part of a confirmation page. If the user chooses to cancel the delete operation from the confirmation page, the user may be returned to the Resource Search page. However, if the user selects the delete link, the resource may be deleted and any resource assignments removed, returning the user to the Resource Search page. According to an embodiment of the present disclosure, a resource may not be deleted if any of the following are true, each of which will be further described below: the resource has un-posted timesheets, the resource is logged into the system, a Post Time or a Create Time is in progress, and/or a project that the selected resource is assigned to is currently checked out. If the resource being deleted is assigned to manage other resources, then those assignments may be set to "None". In addition, all projects that are locked by the resource may be unlocked when the resource is deleted.

Project Search Portlet

The Project Search portlet may allow a user to search for a project. A user may search by using a Quick List, that is, a drop down list box containing pre-defined sort options. Among the sort options are the following: All Projects Assigned To Me, All Projects, All Locked Projects Assigned To Me, All Locked Projects, All Unlocked Projects Assigned To Me, All Unlocked Projects, etc. The Project Name and Project Code fields may be free form text fields. All the search fields may be mutually inclusive. The user may execute a search by clicking the HTML link and may launch help by clicking the HTML "HELP" link. The default value for the Quick List may be "All Projects Assigned To Me" and the search results from this type of search may also be displayed by default. The results from a search may be displayed as a paged list, with each page containing up to a maximum of then projects The user may navigate between each page via a set of numbered links, that may be positioned at the end of the search results. The total number of results may also be displayed at the end of the search results. The following links may be available for each of the projects listed in the search results: View A Project, Edit A Project, Delete A Project, etc.

Delete Project Portlet

The Delete Project portlet may allow a user to delete a selected project. This functionality may be available from the Project Search page. Once the delete link is selected, the project details may be displayed as part of a confirmation page. If the user chooses to cancel the delete operation from the confirmation page, the user may be returned to the Project Search page. However, if the user selects the delete link, the project may be deleted, returning the user to the Project Search page. According to an embodiment of the present disclosure, a project may not be deleted if any of the following are true, each of which will be further described below: the project has un-posted actuals, the project is checked out and locked, and/or a Post Time or a Create Time is in progress.

View Project Portlet

The View Project portlet may allow a user to view a project by clicking the "VIEW" link from the Project Search page. The View Project portlet may allow the user to view the following project attributes: Name, Code, Description, Manager, State, Type, Account Code, Client Code, Revision, Project Status, Locked, Locked By, Scheduler, Schedule From, Start Date, End Date, etc. From the view screen, the user may select an EDIT PROJECT link or a DELETE PROJECT link or may launch help by clicking the HTML "HELP" link.

Unlock Project Portlet

The View Project portlet may allow any user with access to the Project Search portlet to unlock a project that is locked on checkout from the database. This functionality may be limited to Project Managers and/or Administrators within an organization. The UNLOCK PROJECT link may be accessible from the Project Search page allowing only users to unlock a project if they have access to the Project Search page. Selecting the UNLOCK PROJECT link may direct the user to a confirmation page that may allow them to either complete the unlock or cancel the operation.

Edit Project Portlet

The Edit Project portlet may allow the user to edit the attributes of any project selected from the search results. A user may modify the following fields: State, Type, Account Code, Client Code, Revision, Project Status, Manager, Start Date, End Date, Date Received, Date Approved, etc. A user might not be allowed to edit the following fields: Name, Code, Locked, Locked By, Scheduler. A user may launch help by clicking on the HTML "HELP" link.

Project Management Gantt List Portlet

The Project Management Gantt List portlet may allow the project status for a project or a list of projects to be displayed. This project list may be made up of several components, such as a Quick List, or a List of Projects. The project list may be filtered by using a drop down quick list box. A user may filter this project list by using client codes that have been assigned to a project and display only the filtered list. Each project name may be an HTML link that allows the user to drill down into each project. By clicking the project name, a second Project Phase screen containing all relevant details may be displayed. The Project Phases portlet will be described below. A project status may be visually represented by a colored Gantt bar, a sliding bar that changes color depending on the progress of the project. Red may represent projects that are behind schedule, yellow may represent projects that are in danger of falling behind schedule, and green may represent projects that are ahead of schedule or on time.

Project Phases Portlet

The Project Phases List portlet may allow project phase information to be displayed. Each top level phase of a project may be represented by a Gantt bar image. These Gantt bars may be arranged and staggered to show the status color and the relative scheduled start and scheduled finish for each phase of the project. Each project and phase name may be links to allow a user to drill down to a list of tasks that are "at risk" for that project or phase. As a user moves a mouse over each of the phases, the following details may be displayed for that phase: Baseline Start, Baseline Finish, Scheduled Start, Scheduled Finish, Actual Start, Actual Finish, Percent Complete, etc. A phase completion percentage may also be displayed.

Tasks At Risk Portlet

The Tasks At Risk portlet may allow a list of tasks that are at risk in a phase level task to be displayed. The list of tasks may appear in a Work Breakdown Structure (WBS) order and each task in the list may be a link that a user may click on to drill down to get the task's details. A task may be considered at risk if the task has not been finished (actual finish is null), has a baseline to compare against and satisfies the following formula:

(Actual Start-Baseline Start)>(Tolerance Range or Schedule Finish-Baseline Finish)>Tolerance Range Tasks that are at risk may be marked as either red (task is already behind schedule) or yellow (warning that task is in trouble and may fall behind schedule).

Task Status (Details of Tasks At Risk) Portlet

The Task Status portlet may allow a task at risk baseline, actual progress of a task at risk, and completed progress of a task at risk to be displayed by using a Gantt chart. The following information may also be displayed: Baseline Start Date, Baseline Finish Date, Actual Start Date, Actual Finish Date, Percent Complete, etc. A user may be able to navigate to a list of resources assigned to the task at risk by selecting a link.

Tolerance Settings Portlet

The Tolerance Settings portlet may allow an administrator to define the status and/or color settings for projects and tasks. The settings may apply to all projects in an organization. According to an embodiment of the present disclosure, red may represent projects or tasks that are behind schedule, yellow may represent projects or tasks that are in danger of falling behind schedule, and green may represent projects or tasks that are ahead of schedule or on time.

Resource List Portlet

The Resource List portlet may allow a list of resources that are assigned to a given task to be displayed. This list may only be accessible from the Task Status screen. The progress of each resource assigned to a task may by displayed by a Gantt chart.

Team Member To Do List Portlet

The Team Member To Do List portlet may allow task status to be displayed by using a colored Gantt bar. The Team Member To Do List may be made up of either a Quick List or a List of Tasks and may be filtered by using a drop down quick list box with the following options: "display a list of all tasks that are assigned to team member" or "filter the list to show only a list of assignments that are past due." The progress of a task may be displayed by a sliding bar that changes color depending on the progress of the assignment, where red may represent assignments that are behind schedule, yellow may represent assignments that are in danger of falling behind schedule, and green may represent assignments that are ahead of schedule or on time. Each task name may be a HTML link that enables a user to drill down into a task to view extended information related to a task, as provided by the Task Details portlet explained below.

Task Details Portlet

The Task Details portlet may allow the details of any task selected from the Team Member To Do List to be displayed. The following information may be displayed: Scheduled Effort, Actual Effort, Remaining Effort, Baseline Effort, Scheduled Start and Finish, Actual Start and Finish, Baseline Start and Finish, etc. A user may access a list of resources assigned to the current task, as provided by the Resource List portlet explained below, by clicking on an HTML link.

Resource List Portlet

The Resource List portlet may allow a list of resources that are assigned to a given task selected from the Task Detail screen to be displayed. The following information may be displayed for each resource: The Resource Name, The Resource Code, A Gantt Chart, etc. The Gantt chart may represent the progress of each resource assigned to the selected task.

Client Based Software Application

The client based software application may be used to enter and retrieve project related data from a database. A functionality of an embodiment of the present disclosure lies in single step Check-In and Check-Out (CICO), a feature that provides the ability to move a project from the software application into and out of the database repository. The CICO operations may be made available to a user through a menu in the software application. The software application requests both the name of the server that processes the CICO requests and the user's portal ID and stores this information for future transactions. Both the portal login ID and the name of the server may be changed by the user in the software application.

A user may be able to check-in a data file to the database or update an existing project. The data file may be either a new project created in the software application, a project that is already in progress but new to the database, or a project already in progress existing in the database. The existing project may be updated while it is kept locked. A user may only check-in one project per check-in operation. Checking-in a file to the database may be performed on a project that is currently open and is displayed within the software application's graphical user interface. The check-in process may be a batch process, where the data file from the software application is given to the server for processing, returning control of the client machine back to the user.

A user may be able to check-out a data file from the database and lock it or keep it as read only. Once a file is checked out of the database, the data file may be opened with the software application. During a check-out operation, a user may filter the list of projects available for check-out according to one of the following filters: All Projects Assigned To Me, All Projects Not Assigned To Me, and All Projects.

A functionality of an embodiment of the present disclosure lies in CICO relaxed resource rules, a feature that allows a user to check-in an active project that already has resources assigned and where those resources do not already exist within the database repository. A global security option located on the server may prevent project managers from being able to create new resources during a check-in from the software application. All resources that exist in the database may be associated with a resource identifier (resource ID), an internal unique identifier used to distinguish resources. Any resource that does not have a resource ID may be considered a new resource and may be created during the check-in process. For new resources, a user may enter the Resource Name and a Resource Code (i.e., employee ID) within the software application. The Resource Code must be unique for a new resource to be created. If the Resource Code is not unique and matches on that is already in the database, a new resource may not be created. Instead, the resource in the project may be matched with the existing resource in the database. A global security option may be provided on the server, that provides an update (or overwrite) of resource data. The update of resource data may happen for all resources that match one in the database.

According to an embodiment, the software application may contain a taskbar that serves as a shortcut for a user to navigate to common operations performed by the user. The taskbar may be located under the main frame window in the software application and allows users to customize their own working environment by adding, modifying, and/or removing their own shortcuts on the taskbar. The taskbar may be floatable (user may drag it to different positions in the main window), dockable (become part of the application framework when positioned on the left or right side of the application), and may provide a way for a user to organize his/her shortcuts into different folders.

Reporting Tool Application

Project management reports, such as Effort Expended By Project Report, Project Stage Status Report, Task Status Report, Project Resources Assignments Report, Submitted Time Report, Project Status Report, Submitted Time By Project Report, Added Tasks By Project Report, etc. may be generated by the reporting tool application and included as part of the portlets. Each of these reports will be described in detail below.

Effort Expended By Project Report

This report may display all 'Scheduled' and 'In Progress' projects and the percentage of overall effort each project represents for the organization.

Project Stage Status Report

This report may show the stages of each 'Scheduled' or 'In Progress' project and display its status. Stages that are behind schedule may be marked in a certain color, for example, yellow or red. The project may list the stage name and the variance in days. By clicking on the stages, more information may be provided, such as a second report detailing the project name, the stage name, total actual hours, total scheduled hours, total remaining hours, actual start date, scheduled start date, baseline start date, scheduled finish date, variance in days, etc.

Task Status Report

This report may display two drop down list boxes that allow the report to be customized in several ways. The first drop down list box allows the user to select a specific project or choose the 'all projects' section. The second drop down list box allows the user to select the task status information they may like to see, for example, 'scheduled tasks', 'in progress tasks', 'completed tasks', or 'behind schedule tasks'. Based on the project(s) and status selected, a report may be generated showing a list of tasks. The report includes the task name, actual start date, scheduled start date, baseline finish date, scheduled finish date, variance in days, etc. According to an embodiment of the present disclosure, this report may also provide the ability to select a future date range that allows a user to narrow or expand the time range for the report.

Project Resources Assignments Report

This report may display a list of resources assigned to a project and a list of projects assigned to individual resources. Only projects that are 'Scheduled' or 'In Progress' may be displayed.

Submitted Time Report

This report may allow a user to view a report of submitted time and requires that a user select a current timesheet period. The user may have the option of filtering the report by any one of the following: resources with no submitted time, resources with submitted time, all resources, etc. The report may display the resource name and the amount of time submitted.

Project Status Report

This report may show the status of projects that are scheduled to start within a specified date range. The user may enter a report start date and end date and the report may list the following information: Project Manager Name, and for each project assigned to that manager, Project Name, Project Status, Scheduled Dates, Total Number of Projects in each Status, etc.

Submitted Time By Project Report

This report may list the amount of time submitted for a particular project. The user may select a project and the report may display the resource name and the amount of time they submitted for the selected project.

Added Tasks By Project Report

This report may show the tasks that have been manually added by resources assigned to a selected project and tasks that have been added by a resource that is not assigned to a project. A user may add themselves to a task through a "Add Task" functionality available on their timesheet. This functionality will be described in further detail below. A user may select a project and a live time period to run the report against and the report may display a list of resources with the tasks added.

Servlets

Java servlets may be utilized as an extension of the web server for generating dynamic web content. The servlet receives a request from a client, processes the request, and returns the response back to the client. The response typically contains HTML code and/or an image that is displayed, for example, in a web browser.

Depending on the user, a different set of interrelated screens may be generated. For example, a team member may utilize the project management application to retrieve information on resource assignments, based on live data located in the database repository and see at-a-glance the status for the tasks that they are assigned to, including assignment details and resource status information. An organization member, such as an administration manager, resource manager, project manager, executive, etc. may utilize the project management application to retrieve information on projects, based on live data located in the database repository and see at-a-glance the status for the ongoing projects, including project, phase, task and resource status information. Both the organization website and team member website of the present disclosure, will be described in further detail below.

Organization Website

According to an embodiment of the present disclosure, organization functionality in the project management application may be built by using a collection of Java servlets, where each servlet may provide one piece of the functionality.

Two general types of servlets may be utilized, servlets that generate a user interface for a screen and servlets that generate images. The user interface servlets may generate the HTML for a screen, where the HTML may contain one or more tags that reference one or more of the image servlets. When a request is received for a page, the request is checked and if it is not found, then a properties file (for example, graphics.properties) is checked. If the request is not found in the properties file, an internal default may be returned.

Each of the servlets may display a header at the top of the screen, detailing for example, the name of the screen. In addition, an option is provided to display a set of navigation links (the drill down path), where the links may be hard coded and specific to a given way of using the screens together (for example, Project Status List links and Project Phase Status links to At Risk Tasks List, etc.).

A portal window may display a list of projects, filterable by client code and a second portal window may display details for the project that is selected in the first window. The contents of the second window may be replaced with new information as a user drills down.

Figure 4:
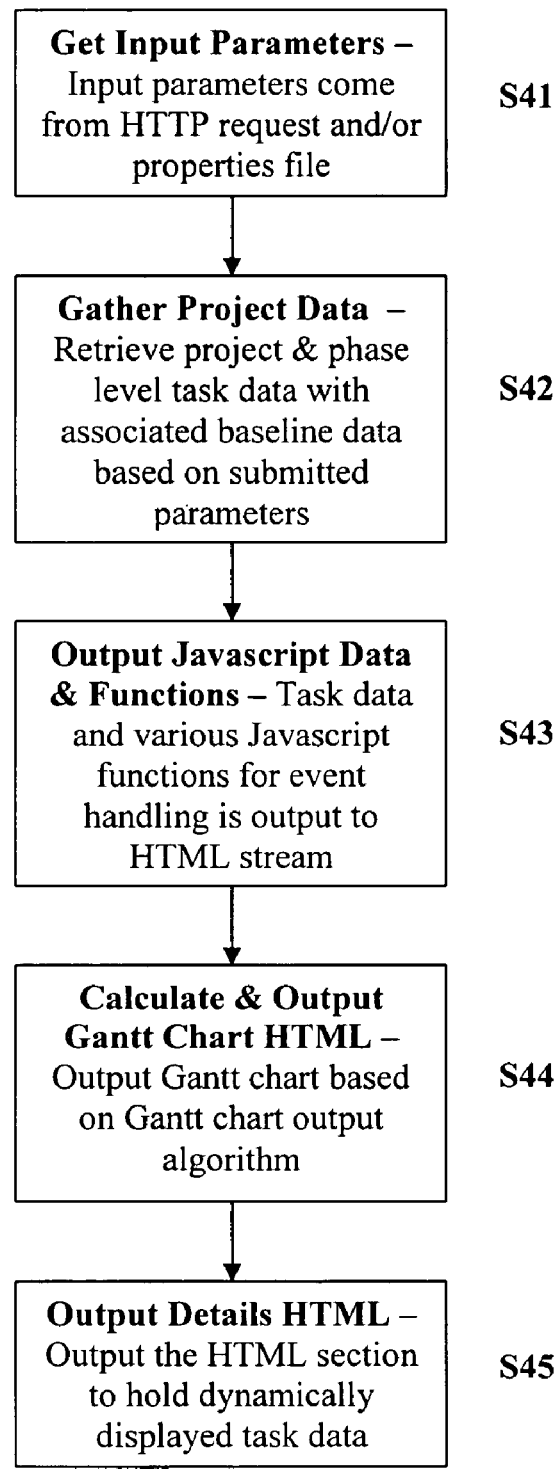
FIG. 4 shows a flow chart illustrating the flow of the servlets, according to an embodiment of the present disclosure.

FIG. 4 shows a flow chart illustrating the flow of each of the servlets, according to an embodiment of the present disclosure. Input parameters are obtained, which may come from HTTP request(s) and/or properties file(s) (Step S41). Project data is gathered (Step S42) and Javascript data and functions are output (Step S43). For example, the system may retrieve project and phase level task data with associated baseline data based on submitted parameters and output the task data and various Javascript functions for event handling to an HTML stream. A Gantt chart is calculated and output in HTML (Step S44), a step that will be described in more detail further below. Details in HTML are output (Step S45). For example, the system may output the HTML section to hold the dynamically displayed task data.

Figure 5:
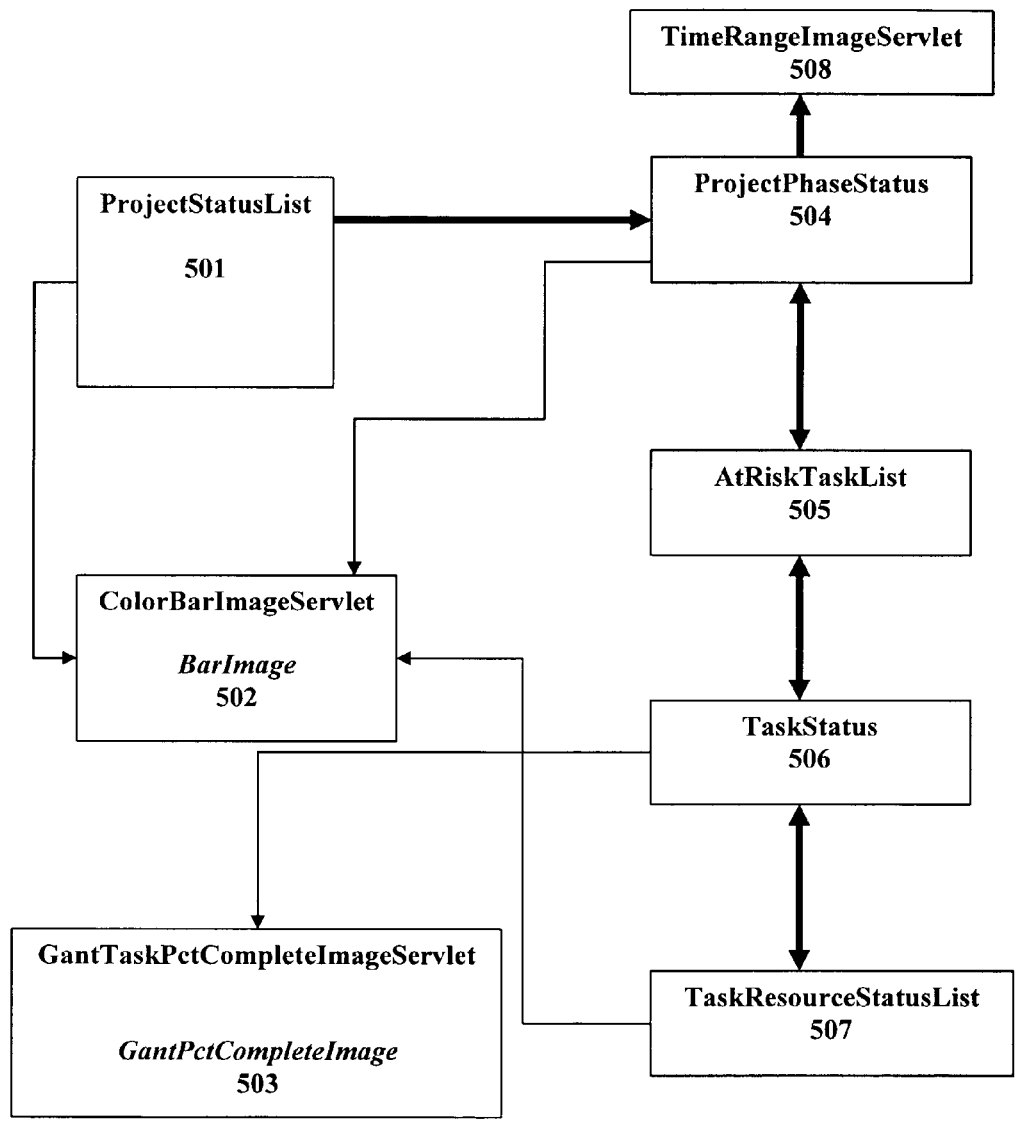
FIG. 5 shows a flow chart illustrating the interdependencies of the servlets for the organization website, according to an embodiment of the present disclosure.

Each of the servlets for the organization website may be dependent on other servlets, as illustrated in FIG. 5. The ProjectStatusList module 501 may be dependent on the ColorBarImageServlet 502 and ProjectPhaseStatus 504 modules, where the ProjectPhaseStatus module 504 displays the details of a project when it is clicked. The ProjectPhaseStatus module 504 may be dependent on the ColorBarImageServlet 502, TimeRangeImageServlet 508, and AtRiskTaskList 505 modules and may be able to create valid requests in HTML for the image tags referring to each respective module, discussed in further detail below. The AtRiskTaskList module 505 is dependent on the ProjectPhaseStatus 504 and TaskStatus 506 modules, where the TaskStatus module 506 is triggered when a user drills down into the task list by clicking on the task. The TaskStatus module 506 is dependent on ProjectPhaseStatus 504, AtRiskTaskList 505, GanttTaskPctCompleteImageServlet 503, and TaskResourceStatusList 507 modules, where the TaskResourceStatusList module 507 is triggered when a user drills down to the list of resources assigned to the task. The TaskResourceStatusList module 507 is dependent on ProjectPhaseStatus 504, AtRiskTaskList 505, TaskStatus 506, and ColorBarImageServlet 502 modules. The ColorBarImageServlet 502 and GantTaskPctCompleteImageServlet 503 modules are not dependent on any other servlet classes.

Each of the servlets for the organization website will be described in further detail below.

Module 1—Project Status List

According to an embodiment of the present disclosure, a functionality of an embodiment of the present disclosure lies in a Java servlet, ProjectPhaseStatus, that extracts project data from a repository through framework (e.g., data access/encapsulation) classes and then produces HTML that contains tables, text and image elements. These elements are properly sized and aligned such that they produce a complete chart.

Figure 6:
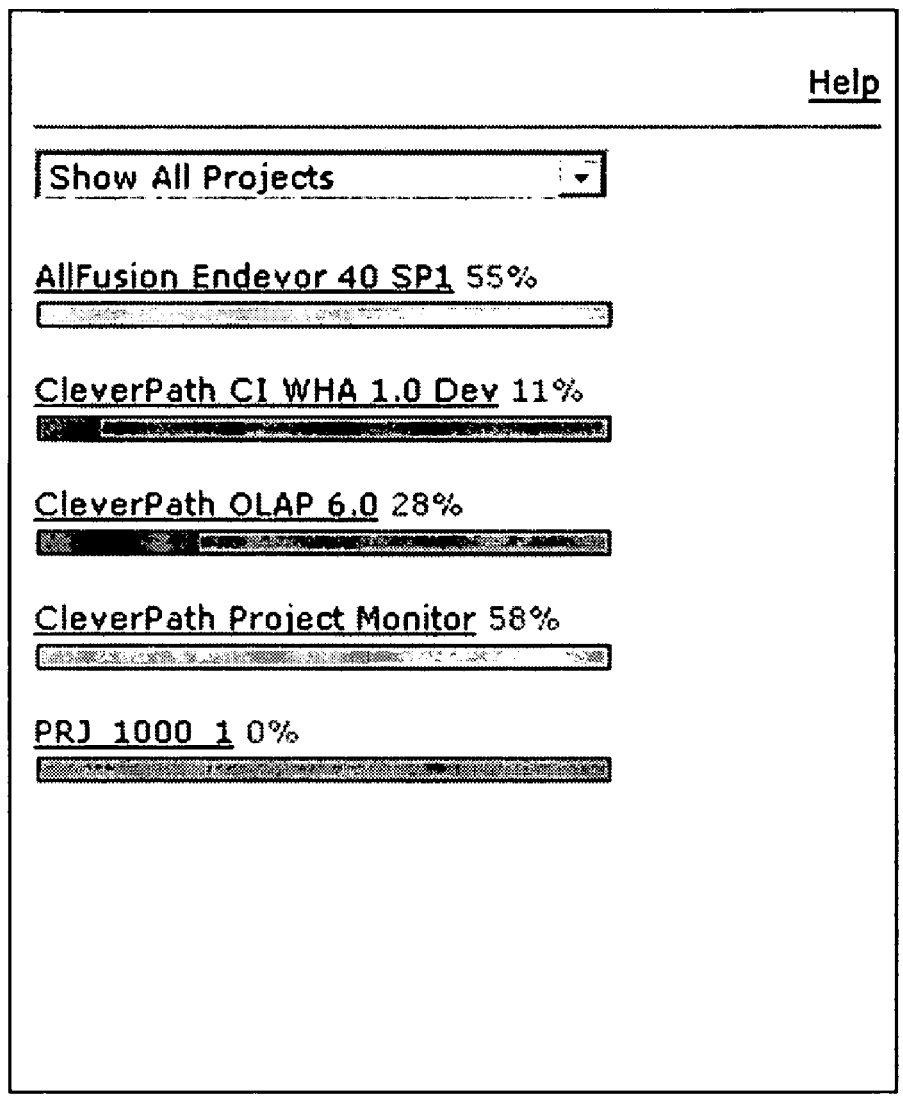
FIG. 6 shows an HTML output page generated by the ProjectStatusList servlet from a user's perspective, according to an embodiment of the present disclosure.

This java servlet may generate an HTML page that contains a drop down list of project client codes and a list of projects matching the drop down criteria. The drop down list may contain the projects that are either in a "Scheduled" state (state=1) or an "In Progress" state (state=2). The list of projects may include the project name and a bar image, BarImage, for each project may also be displayed. The bar image is HTML tag referencing the ColorBarImageServlet, which will be described in detail further below. FIG. 6 illustrates an HTML output page generated by the ProjectStatusList servlet from a user's perspective, according to an embodiment of the present disclosure.

The-ProjectStatusList servlet produces HTML output based on the parameters that are submitted to it. The parameters may include:

imgHeight—The height of the bar chart to be requested. The default value may be 15.

imgWidth—The width of the images to be requested. The default value may be 200.

imgBGColor—The hex code (e.g., #FFFFFF) for the background color of the images. The default may be the hex code for the color white.

barHeight—The height of the bar to be drawn in the image.

fontFace—The font that may be used on the images. The default may be Verdana.

locale—The java locale code (e.g., en_US) for the locale to use for formatting dates, etc. The default may be the system default.

dayRangeWarn—The number of days a project may be late before the system goes to warning severity. This value may be set directly from system parameters.

dayRangeCrit—The number of days after dayRangeWarn that a project may be late before it goes to overdue severity. This value may be calculated from the system parameters.

targetFrame—The name of the frame to target when a link is clicked. This may serve as an external interface to other modules.

Module 2—ProjectPhaseStatus

According to an embodiment of the present disclosure, another functionality of an embodiment of the present disclosure lies in a Java servlet, ProjectPhaseStatus, that extracts project data from a repository through framework (e.g., data access/encapsulation) classes and then produces HTML that contains tables, text and image elements. These elements are properly sized and aligned such that they produce a complete chart.

Figure 7:
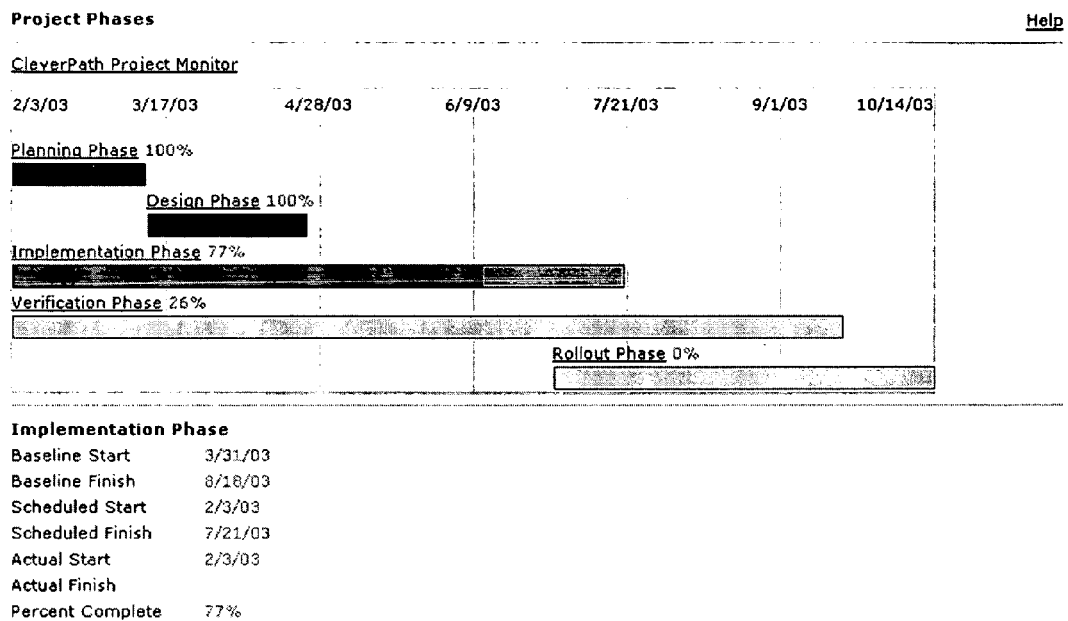
FIG. 7 shows an HTML output page generated by the ProjectPhaseStatus servlet from a user's perspective, according to an embodiment of the present disclosure.

This java servlet may generate an HTML page that contains the basic stats for a project, in addition to displaying a simplified Gantt chart for the phase level tasks. FIG. 7 illustrates an HTML output page generated by the ProjectPhaseStatus servlet from a user's perspective, according to an embodiment of the present disclosure. A bar image, BarImage may be provided for each phase of the project. The BarImage images may be arranged and staggered to show the status color and the relative start and finish for each phase of the project. The project and phase names may be links to allow a user to drill down to a list of tasks that are at risk for that project or phase. A background image may display a "chart" of time from the first date to the last date. If a project has no schedule information, then the Gantt images may not be displayed and a message may be generated and displayed indicating that there is no schedule information for the given project. In addition, information such as, Scheduled Start, Actual Start, etc. may be provided for each phase. As a user moves their mouse over each of the phases, the additional information may be displayed for that phase.

The ProjectPhaseStatus servlet produces HTML output based on the parameters that are submitted to it. The parameters may include:

projID—The ID of the project to show. If null, an error may be displayed.

imgHeight—The height of the bar chart to be requested. The default value may be 15.

imgWidth—The width of the chart to be requested. The default value may be 625.

imBGColor—The hex code (e.g., #FFFFFF) for the background color of the images. The default may be the hex code for the color white.

locale—The java locale code (e.g., en_US) for the locale to use for formatting dates, etc. The default may be the system default.

dayRangeWarn—The number of days a project may be late before the system goes to warning severity. This value may be set directly from system parameters.

dayRangeCrit—The number of days after dayRangeWarn that a project may be late before it goes to overdue severity. This value may be calculated from the system parameters.

navHdrTyp—The code specifying what, if any, navigation header to use. For example, for the Organizational Website the code might be "projStatus".

Parameters may be set in a graphics.properties file, but not submitted on the request are:

lineColor—The color of the background lines for the TimeRangeImage.

lineFreq—The approximate spacing that the lines may occur in the TimeRangeImage. This may be in units of pixels.

dateFreg—The approximate spacing that the date labels may occur in the TimeRangeImage. This may be in units of pixels.

According to an embodiment of the present disclosure, the system may determine the status of a project phase or resource task assignment based on baseline start, baseline finish, scheduled finish, actual start and actual start dates, as well as warning and critical tolerance ranges. An example of a method for implementing this system may now be described. An item is in warning status if: (actual start-baseline start>warning tolerance range or scheduled finish-baseline finish>warning tolerance range) and the item has not been finished (actual finish is null) and the item has a baseline to compare against. An item is in overdue status if: (actual start-baseline start>critical tolerance range or scheduled finish-baseline finish>critical tolerance range) and the item has not been finished (actual finish is null) and the item is considered in normal status. Otherwise, if baseline data is available, the item is considered in normal status. However, if baseline data is not available, then the item is considered in unknown status. Overdue status supersedes warning status, which supersedes normal status.

The system for determining the status will now be described in more detail. Although described herein as Java, any other form of suitable coding may be implemented as desired. The present system may be implemented in a Java class to provide for simple, self-contained use. The class calculates the severity based on the dates. Calculation may result in one of the following integer values:

0 (SEVERITY_UNKNOWN)

1 (SEVERITY_NORMAL)

2 (SEVERITY_WARNING)

4 (SEVERITY_OVERDUE)

The set of parameters may include:

| | |
|---|---|
| baselineStart | instance of java.util.Calendar |
| baselineFinish | instance of java.util.Calendar |
| scheduledStart | instance of java.util.Calendar |
| scheduledFinish | instance of java.util.Calendar |
| actualStart | instance of java.util.Calendar |
| actualFinish | instance of java.util.Calendar |
| iWarningDayRange | an integer. The number of days that dates may be behind schedule before they are considered to be in the WARNING level severity. |
| iOverdueDayRange | an integer. The number of day AFTER the warning level that a date may be behind before it is considered to be at the OVERDUE severity. |

The baseline start and finish are used. At least one of the following may also be used: scheduled start, actual start, scheduled finish, or actual finish.

According to an embodiment of the present disclosure, an outline for an algorithm implementing this feature is as follows:

```
If item's baseline status is 0 (SEVERITY_UNKNOWN), then stop algorithm.
Start assuming that status is 1 (SEVERITY_NORMAL), continue algorithm.
    Determine which finish to use:
        If actual finish is not null, then use actual finish for finish.
        Else use scheduled finish for finish.
    Determine severity based on finish:
        If (finish - baseline finish > critical tolerance range) status is 4 (SEVERITY_OVERDUE), stop algorithm.
        If (finish - baseline finish > warning tolerance range) status is 2 (SEVERITY_WARNING), continue algorithm.
    Determine which start to use:
        If actual start is not null, then use actual start for start.
        Else if scheduled start is not null, used scheduled start for start.
        If using scheduled start and scheduled start is before current date, then use current date.
    Determine severity based on start:
        If (start - baseline start > critical tolerance range) status is 4 (SEVERITY_OVERDUE), stop algorithm.
        If (start - baseline start > warning tolerance range) status is 2 (SEVERITY_WARNING), continue algorithm.
    Determine severity based on schedule compared with actual:
        If actual start is not null and scheduled start is not null, then
            If (actual start - scheduled start > critical tolerance range) status is 4 (SEVERITY_OVERDUE), stop algorithm.
            If (actual start - scheduled start > warning tolerance range) status is 2 (SEVERITY_WARNING), continue algorithm
END
```

The present system may also be implemented as desired by relying on actual dates (e.g., not falling back to scheduled dates), not including the comparison of the actual start to scheduled start and/or relying on baseline dates for comparison. The above system results in a "worst case status", although the system may be implemented to produce a "best case status".

Module 3—AtRiskTaskList

According to an embodiment of the present disclosure, another functionality of an embodiment of the present disclosure lies in a Java servlet, AtRiskTaskList, that extracts project data from a repository through framework (e.g., data access/encapsulation) classes and then produces HTML that contains tables, text and image elements.

This java servlet may generate an HTML page that contains a list of tasks that are at risk in a given project or task. A task may be considered at risk if (actual start-baseline start >tolerance range) or (scheduled finish-baseline finish>tolerance range) and the task has not been finished (actual finish is null) and has a baseline to compare against. Each task in the list may be a link that a user may click on to drill down and get the task's details. FIG. 8 illustrates an HTML output page generated by the AtRiskTaskList servlet from a user's perspective, according to an embodiment of the present disclosure. A red dot next to the task name may indicate an overdue level severity. A yellow dot may indicate a warning level severity. Clicking on a task name may allow a user to drill down to the task status screen.

The AtRiskTaskList servlet produces HTML output based on the parameters that are submitted to it. The parameters may include:

projID—The ID of the project to show. If null, an error may be displayed.

taskID—The ID of the task to show. This parameter may be made optional. If it is not submitted, then the list of at risk tasks may be for the entire project.

dayRangeWarn—The number of days a task may be late before the system goes to warning severity. This value may be set directly from system parameters.

dayRangeCrit—The number of days after dayRangeWarn that a task may be late before it goes to overdue severity. This value may be calculated from the system parameters.

navHdrTyp—The code specifying what, if any, navigation header type to use. For example, the code may be "projStatus."

Module 4—TaskStatus

According to an embodiment of the present disclosure, another functionality of an embodiment of the present disclosure lies in a Java servlet, TaskStatus, that extracts project data from a repository through framework (e.g., data access/encapsulation) classes and then produces HTML that contains tables, text and image elements. These elements may be properly sized and aligned such that they produce a complete chart.

Figure 9:
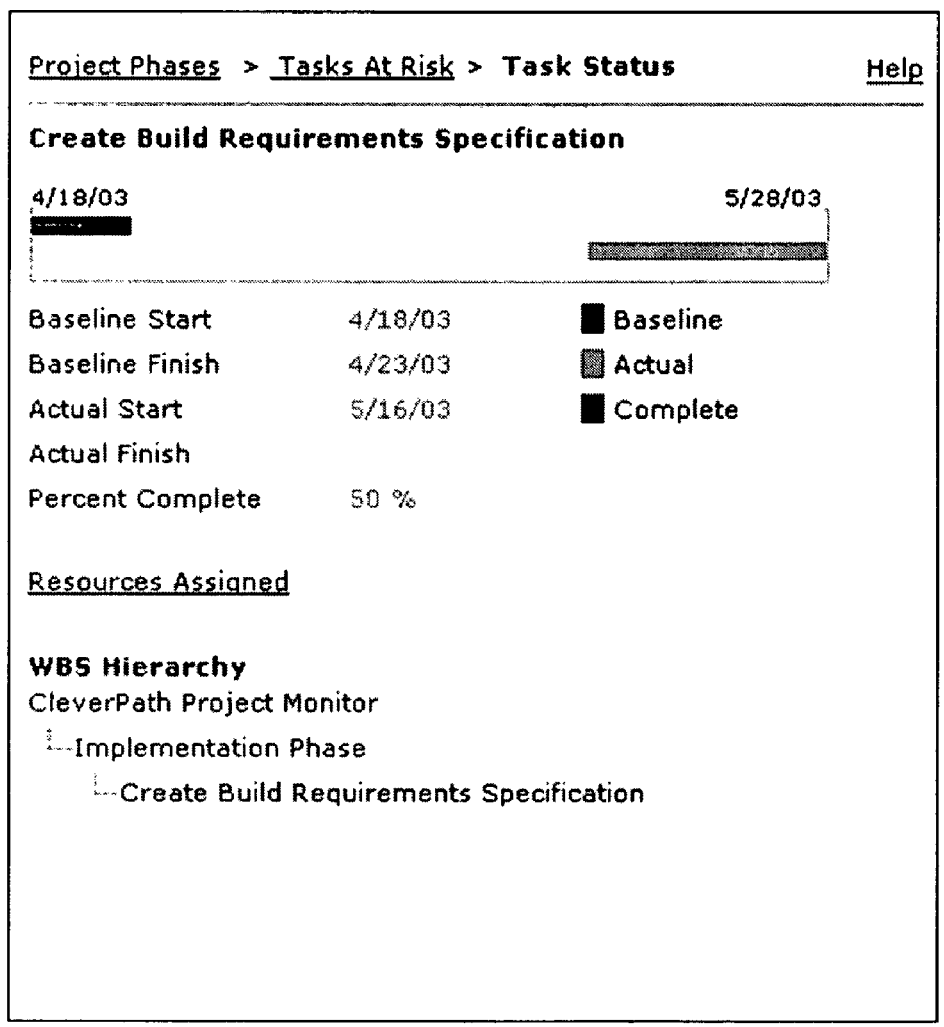
FIG. 9 shows an HTML output page generated by the TaskStatus servlet from a user's perspective, according to an embodiment of the present disclosure.

This java servlet may generate an HTML page that contains the basic stats for a task. The task name, simplified Gantt chart and related details are all displayed. By clicking on a link to a list of resources, a user may drill down to display the list of resources assigned to the task. The hierarchy, from project level to selected task may be displayed at the bottom of the page. FIG. 9 illustrates an HTML output page generated by the TaskStatus servlet from a user's perspective, according to an embodiment of the present disclosure.

The TaskStatus servlet produces HTML output based on the parameters that are submitted to it. The parameters may include:

projID—The ID of the project to show. If null, an error may be displayed.

taskID—The ID of the task to show.

imgHeight—The height of the images to be requested. The default value may be 50.

imgWidth—The width of the images to be requested. The default value may be 350.

imgBGColor—The hex code (e.g., #FFFFFF) for the background color of the images. The default may be the hex code for the color white.

fontFace—The font to use on the images. The default value may be Verdana.

locale—The java locale code (e.g., en_US) for the locale to use for formatting dates, etc. The default may be the system default.

navHdrTyp—The code specifying what, if any, navigation header type to use. For example, the code may be "projStatus."

Module 5—TaskResourceStatusList

According to an embodiment of the present disclosure, another functionality of an embodiment of the present disclosure lies in a Java servlet, TaskResourceStatusList, that extracts project data from a repository through framework (e.g., data access/encapsulation) classes and then produces HTML that contains tables, text and image elements.

Figure 10:
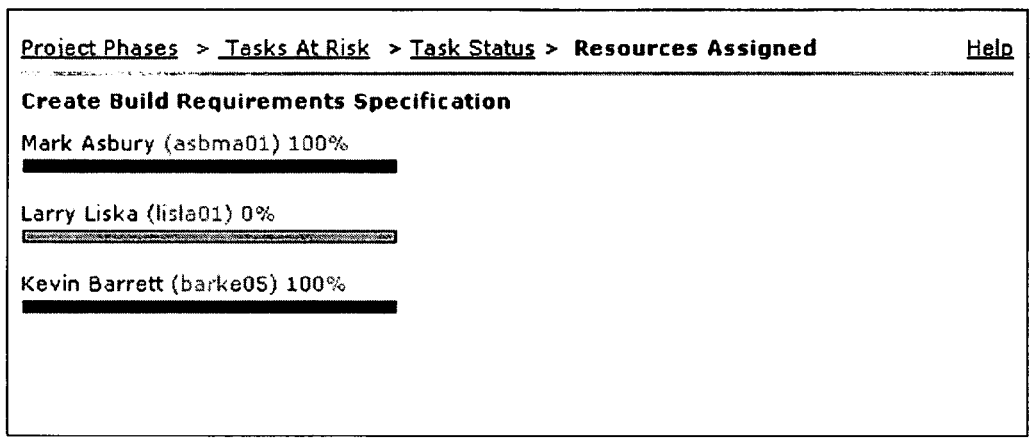
FIG. 10 shows an HTML output page generated by the TaskResourceStatusList servlet from a user's perspective, according to an embodiment of the present disclosure.

This java servlet may generate an HTML page that contains a list of resources that are assigned to a given task. A resource name, resource code and percent complete bar image may be displayed. FIG. 10 illustrates an HTML output page generated by the TaskResourceStatusList servlet from a user's perspective, according to an embodiment of the present disclosure.

The TaskResourceStatusList servlet produces HTML output based on the parameters that are submitted to it. The parameters may include:

projID—The ID of the project of the task to show. If null, an error may be displayed.

taskID—The ID of the task to show dayRangeWarn—The number of days a task may be late before the system goes to warning severity. This value may be set directly from system parameters.

dayRangeCrit—The number of days after dayRangeWarn that a task may be late before it goes to overdue severity. This value may be calculated from the system parameters.

navHdrTyp—The code specifying what, if any, navigation header type to use. For example, the code may be "projStatus."

Module 6—ColorBarImageServlet

According to an embodiment of the present disclosure, this java servlet may generate a simple bar graph image for the parameters that are submitted. The image may be returned in JPEG format.

The ColorbarImageServlet produces and returns a simple horizontal bar graph image for the parameters that are submitted. The parameters may include:

position—The amount the bar graph is filled. This value may be between 0 and 100.

height—The height of the image to be generated. The default value may be 30. The minimum value may be 5 and the maximum value may be 1000.

width—The width of the image to be generated. The bar may attempt to fill the width.

bgColor—The hex code (e.g., #FFFFFF) for the background color of the image. The default may be the hex code for the color white.

barHeight—The height of the bar in the image. The default value may be 6. The minimum value may be 3 and the maximum value may be 1000.

fontFace—The font to use on the image. The default may be Verdana.

Locale—The java locale code (e.g., en_US) for the locale to use for formatting dates, etc. The default may be the system default.

Module 7—GantTaskPctCompleteImageServlet

According to an embodiment of the present disclosure, a simplified custom Gantt chart may be delivered on, for example, a web page. The present embodiment greatly simplifies the creation of Gantt images.

According to this embodiment, a java servlet and other java classes may dynamically generate a simplified Gantt image for at least one task or activity, based on live repository data. For example, this may include colored bars for baseline, scheduled and actual status. These bars are rendered based on the relative timing of the start and finish dates (e.g., baseline start, baseline finish). Instead of colored bars, some other type of system may be used to distinguish the bars, such as shades of color, different patterns, etc. The image may be returned in a JPEG format.

This aspect of the present disclosure generally relates to small numbers of task items, For example, the present embodiment is described with respect to one task item. It displays a start date, for the start of the chart, and a finish date, for the end of the chart. Other dates may be inferred by the relative positions of the colored bars.

Figure 12:
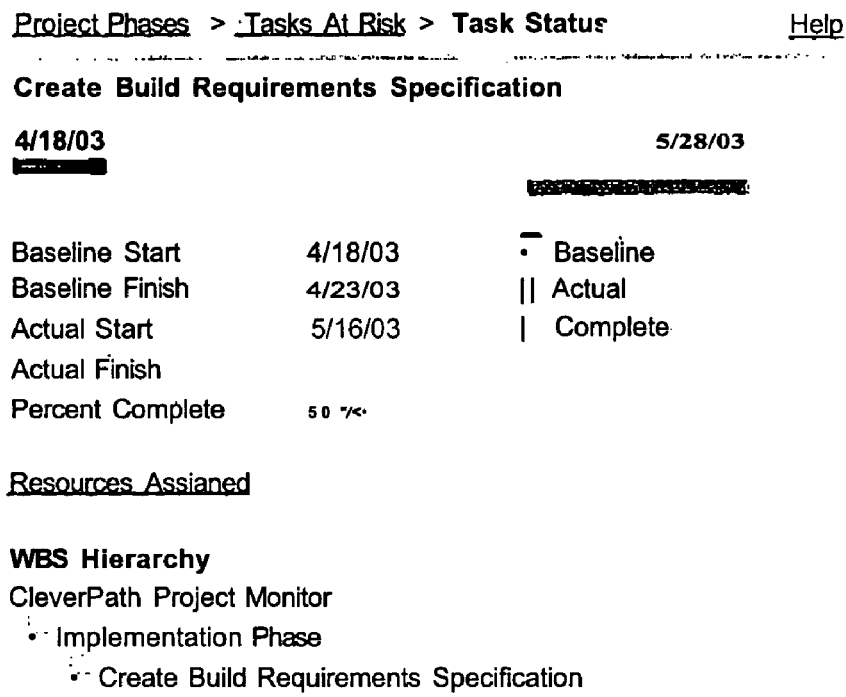
FIG. 12 shows an image, according to an embodiment of the present disclosure.

This embodiment includes two elements, a Java servlet class and a Java class. The Java servlet class, GantTaskPctCompleteImageServlet, handles HTTP requests, getting the task data, using a GantPctCompleteImage class, and returning the image. The Java class, GantPctCompleteImage, builds the image based on submitted parameters. An example of the resulting page is shown in FIG. 11. FIG. 12 shows an example of the image in use.

Examples of parameters for the GantPctCompleteImage class may include the following:

| | |
|---|---|
| Actual Start | no default |
| Actual Finish | no default |
| Baseline Start | no default |
| Baseline Finish | no default |
| Image Width | default may be 300 |
| Image Height | default may be 40 |
| Font Face | default may be Verdana |
| Background Color | default may be hex code #FFFFFF |
| Baseline Color | default may be hex code #000000 |
| Complete Color | default may be hex code #FF0000 |
| Actual Color | default may be hex code #00FF00 |
| Bar Height | default may be 10 |
| Percent Complete | default may be 0 |
| Locale | default may be system default. |

The actual start and actual finish may be null. The locale is used to format the dates into strings.

Figure 13:
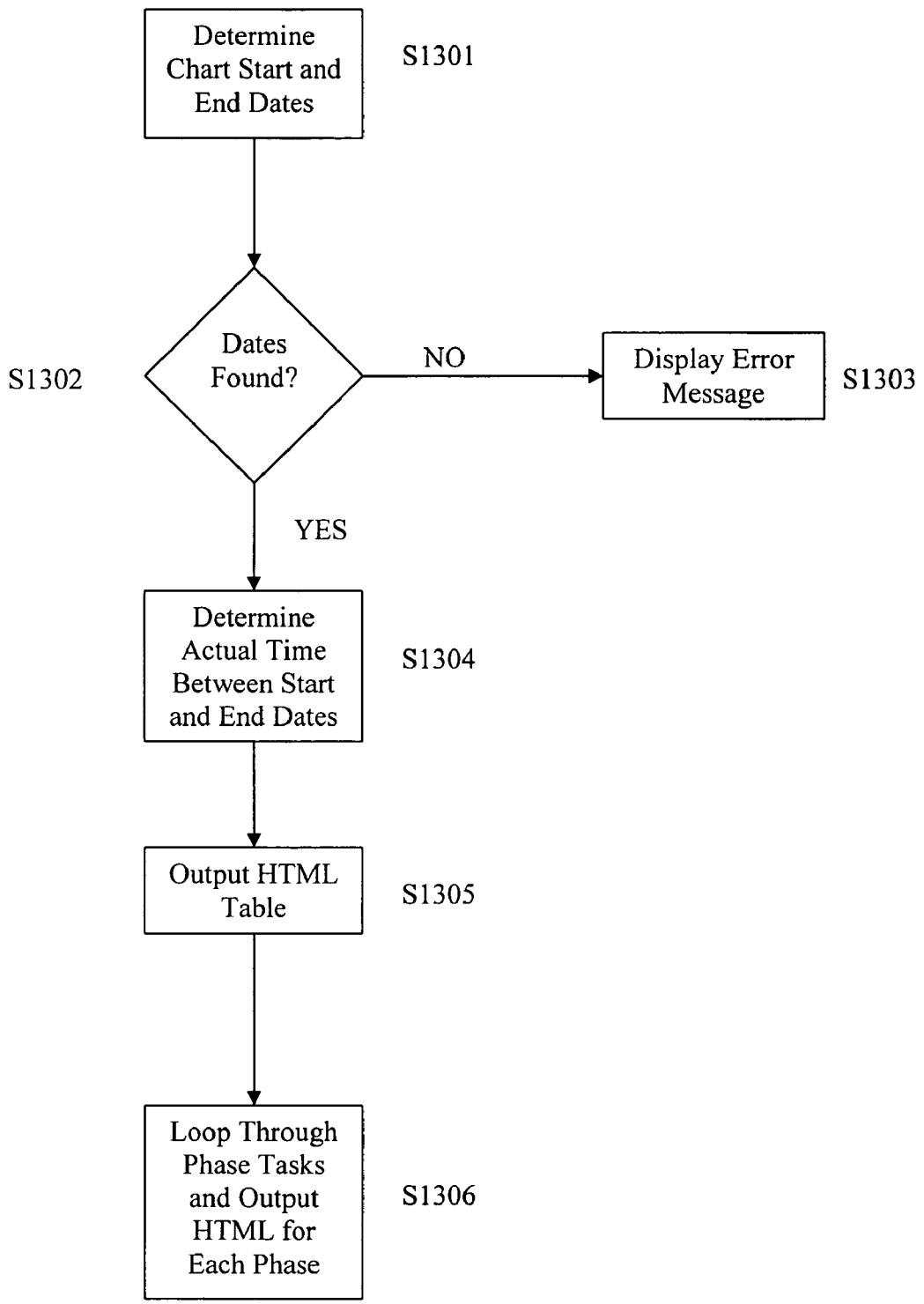
FIG. 13 shows a flow chart illustrating an algorithm that calculates and outputs a Gantt chart in HTML.

The system calculates and outputs the Gantt image in HTML by using a methodology as that shown in FIG. 13. The system determines the chart start and end dates by looping through all the task items, comparing the actual start and scheduled start dates to find the start date and the actual finish and scheduled finish dates to find the end date for each item (Step S1301). If a chart start or end date is not found (Step 1302), then an error message is displayed (Step S1303) and the system stops. If a chart start or end date is found, then the system determines the actual time between the start and end dates (Step S1304), in other words, the total chart time span. The system outputs the HTML table that may hold other chart tables (Step S1305), forming the container and background for the charts. The system sets a background tag of the table to a TimeRangeImageServlet, using the calculated chart start and end dates, as well as other parameters. The system then loops through phase tasks and outputs HTML for each phase (Step S1306) by determining the start date and end date for a phase bar. If the actual start is not null, then it is used for the phase bar start or if the scheduled start is not null, then it is used for the phase bar start. If the actual finish is not null, then it is used for the phase bar end or if the scheduled finish is not null, then it is used for the phase bar end. If the phase bar start or phase bar end is null, a message may be printed and the system may continue to the next phase task. If the phase bar start or phase bar end is not null, then the system may determine the color for the phase bar. Although described herein as using color as a characteristic distinguishing phase bars, other distinguishing characteristics may be used instead of or in addition to color. For example, a system may be provided that determines the status (in any number of categories) of a given project activity and assigns a color (or shade, patter, etc.) based thereon as will be described in more detail later below. To get the offset, the system calculates an offset of a phase bar from the left edge of the chart, calculate the actual time from the chart start date to phase bar start date, convert that value to percent of total chart time span, and multiply the percent by the chart width. To get the bar width, the system calculates the width of the phase bar, calculates the actual time from phase bar start to phase bar end dates, converts to percent of total chart time span, and multiplies the percent by the chart width. The system then outputs the HTML table for the phase bar, outputs the table cell that is sized for the offset and outputs the phase name as a link. If the phase bar width is greater than 0, then the system outputs the HTML image tag formatted to reference the ColorBarImageServlet. If the phase bar width is less than 0, then the system outputs an HTML image tag for the small "milestone task" image.

Figure 14:
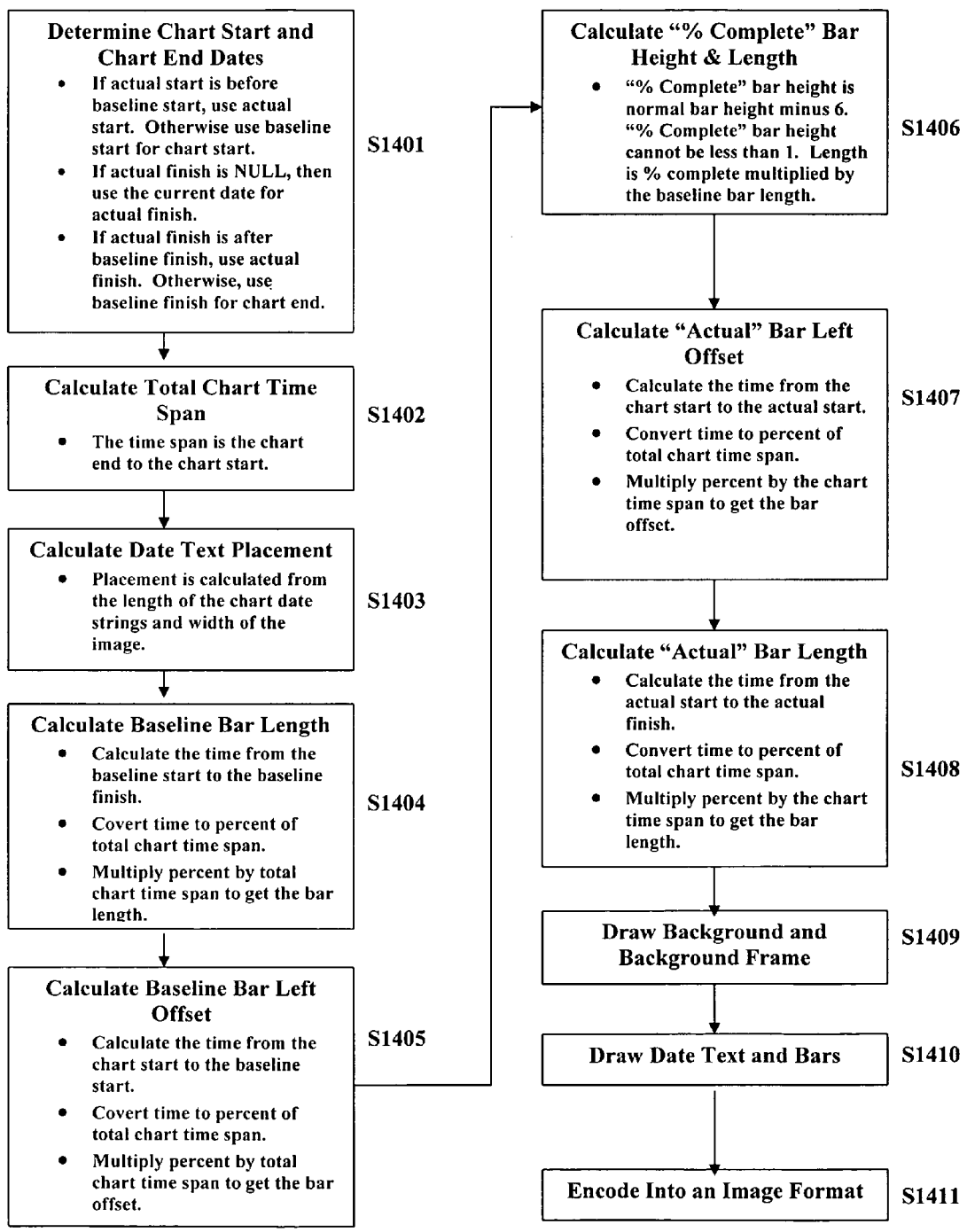
FIG. 14 shows a flow chart further detailing the algorithm that calculates and outputs a Gantt chart in HTML.

A more detailed overview of the methodology for drawing a simplified Gantt chart, according to an embodiment of the present disclosure is shown in FIG. 14. The system determines a chart start and chart end (Step S1401). If the actual start is before the baseline start, the actual start is used as the chart start. But if the actual start is after the baseline start, then the baseline start is used as the chart start. If the actual finish is null, then the current date is used for the actual finish. If the actual finish is after the baseline finish, the actual finished is used as the chart end. But if the actual finish is after the baseline finish, then the baseline finish is used as the chart end. The total chart time span is calculated (Step S1402). This time span may be the chart end to the chart start. The date text placement is then calculated (Step S1403) and the baseline bar length is calculated (Step S1404). The date text placement may be calculated from the length of the chart date strings and width of the image. The baseline bar length is calculated by first calculating the time from the baseline start to the baseline finish, converting the time to percent of the total chart time span, and multiplying the percent by the total chart time span. The baseline bar left offset is determined by calculating the time from the chart start to the baseline start, converting the time to percent of the total chart time span, and multiplying the percent by the total chart time span (Step S1405). The "% Complete" bar height and length is calculated where the "% Complete" bar height is the normal bar height minus 6 and may not be less than 1, and the "% Complete" bar length is % complete multiplied by the baseline bar length (Step S1406). The "Actual" bar left offset is determined by calculating the time from chart start to the actual start, converting the time to percent of total chart time span, and multiplying the percent by the chart time span (Step S1407). The "Actual" bar length is determined by calculating the time from actual start to the actual finish, converting the time to percent of the total chart time span, and multiplying the percent by the chart time span (Step S1408). The background and background frame may then be drawn (Step S1409) in addition to the date and text bars (Step S1410). The image may then be encoded into any image format, for example, JPEG format (Step S1411).

Figure 15:
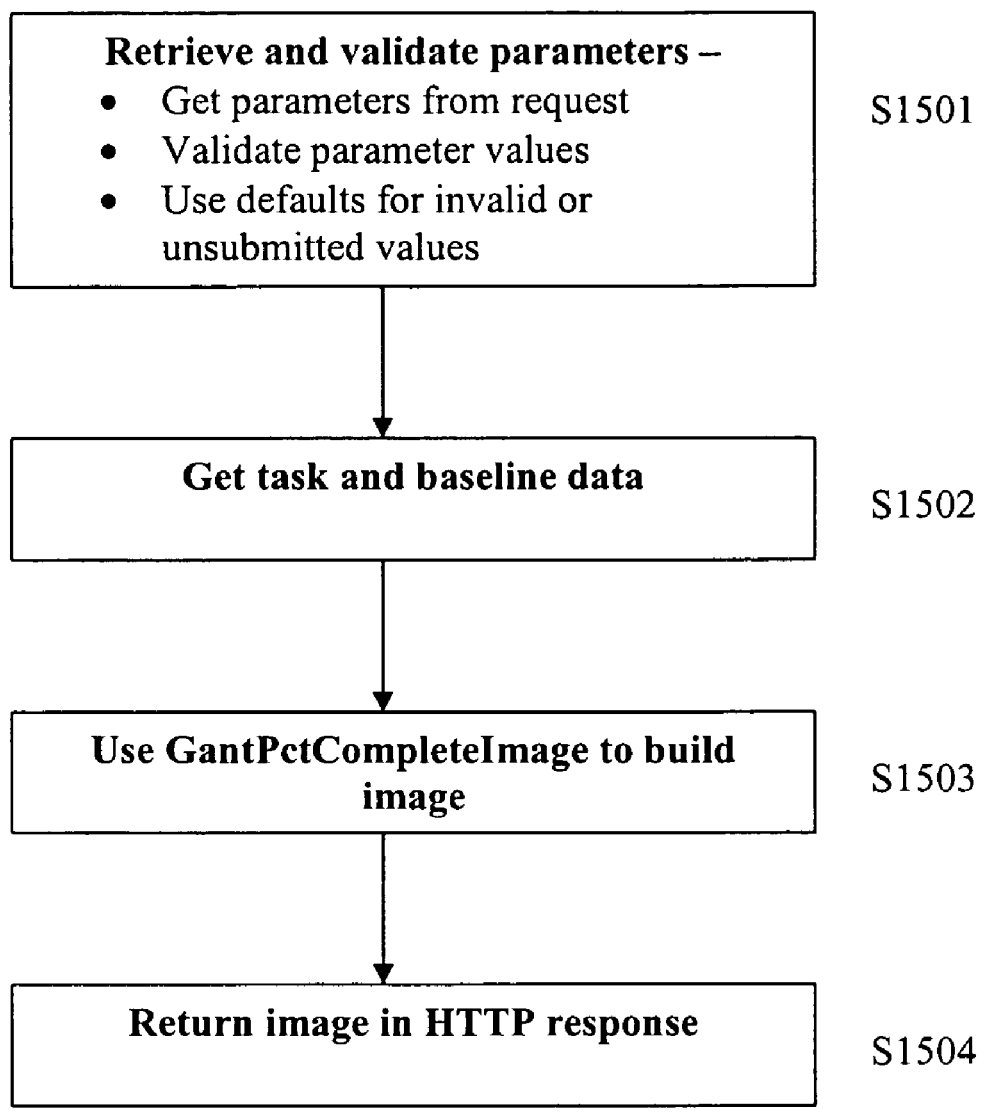
FIG. 15 shows a flow chart illustrating the interdependencies of the servlets for the team member website, according to an embodiment of the present disclosure.

FIG. 15 is a flow chart showing the GantTaskPctCompleteImageServlet flow, according to an embodiment of the present disclosure. The parameters may be retrieved and validated (Step S1501) and the task data and baseline data may be obtained (Step S1502). The GantPctCompleteImage may be used to build the image (Step S1503). The image may then be returned in the HTTP response (Step S1504).

The embodiments disclosed herein may be implemented through the use of HTML tables and scaled IMG tags instead of as a single image.

The GantTaskPctCompleteImageServlet produces and returns a simple horizontal bar graph image for the parameters that are submitted. The parameters may include:

projID—The ID of the project to create the Gantt chart for. This is a required parameter.

taskID—The ID of the task to create the Gantt chart for. This is a required parameter.

imgHeight—The height of the image to be generated. The default value may be 40. The minimum value may be 20 and the maximum value may be 1000.

imgWidth—The width of the image to be generated. The default value may be 200. The minimum value may be 20 and the maximum value may be 1000.

imgBGColor—The hex code (e.g., #FFFFFF) for the background color of the image. The default value may be the hex code for the color white.

gntBaseInColor—The hex code (e.g., #FFFFFF) for the baseline bar of the image. The default value may be the hex code #000000.

gntComlColor—The hex code (e.g., #FFFFFF) for the complete bar of the image. The default value may be the hex code #FF0000.

gntActColor—The hex code (e.g., #FFFFFF) for the actual bar of the image. The default value may be the hex code #57A743 for the color darkish green.

fontFace—The font to use on the image. The default value may be Verdana.

locale—The java locale code (e.g., en_US) for the locale to use for formatting dates, etc. The default may be the system default.

Team Member Website

According to an embodiment of the present disclosure, team member functionality in the project management application may be built by using a collection of Java servlets, where each servlet may provide one piece of the functionality. Two general types of servlets may be utilized, servlets that generate a user interface for a screen and servlets that generate images. The user interface servlets may generate the HTML for a screen, where the HTML may contain one or more tags that reference one or more of the image servlets. When a request is received for a page, the request is checked and if it is not found, then a properties file (for example, graphics.properties) is checked. If the request is not found in the properties file, an internal default may be returned.

Each of the servlets may display a header at the top of the screen, detailing for example, the name of the screen. In addition, an option is provided to display a set of navigation links (the drill down path), where the links may be hard coded and specific to a given way of using the screens together.

A portal window may display a list of resource assignments, filterable by status and/or date criteria and a second portal window may display details for the assignment that is selected in the first window. The contents of the second window may be replaced with new information as a user drills down.

FIG. 4 shows a flow chart illustrating the flow each of the servlets, according to an embodiment of the present disclosure. Input parameters are obtained, which may come from HTTP request(s) and/or properties file(s) (Step S41). Project data is gathered (Step S42) and Javascript data and functions are output (Step S43). For example, the system may retrieve project and phase level task data with associated baseline data based on submitted parameters and output the task data and various Javascript functions for event handling to an HTML stream. A Gantt chart is calculated and output in HTML (Step S44), a step that will be described in more detail further below. Details in HTML are output (Step S45). For example, the system may output the HTML section to hold the dynamically displayed task data.

Figure 16:
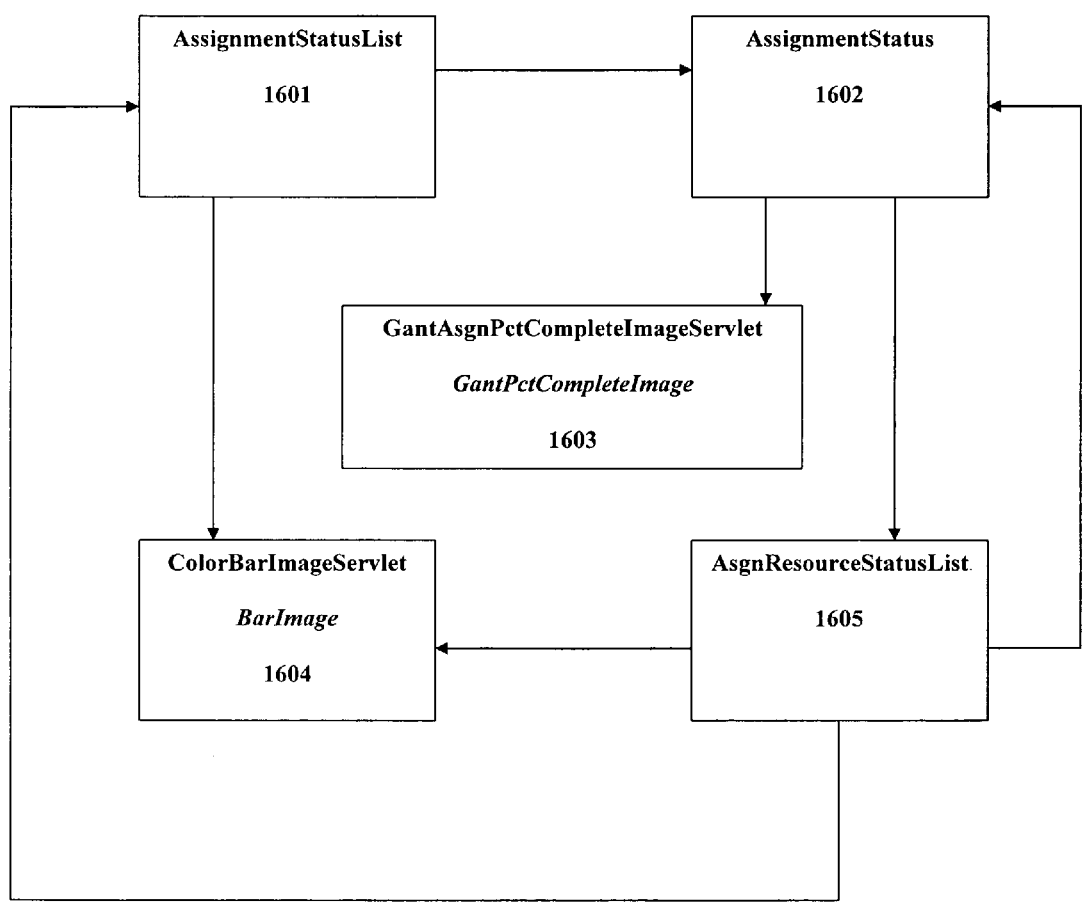
FIG. 16 illustrates an HTML output page generated by the AssignmentStatusList servlet from a user's perspective, according to an embodiment of the present disclosure.

Each of the servlets for the team member website may be dependent on other servlets, as illustrated in FIG. 16. The AssignmentStatusList module 1601 is dependent on the ColorBarImageServlet 1604 and AssignmentStatus modules 1602, where the AssignmentStatus module 1602 is triggered when a user clicks on a project to display its details. The AssignmentStatus module 1602 is dependent on the GantAssgnPctCompleteImageServlet 1603 and AsgnResourceStatusList modules 1605, where the AsgnResourceStatusList module 1605 is triggered when a user drills down to the list of resources assigned to a task. The AsgnResourceStatusList module 1605 is dependent on AssignmentStatusList 1601, AssignmentStatus 1602 and ColorBarImageServlet modules 1604. The ColorBarImageServlet 1604 and GantAsgnPctCompleteImageServlet 1603 are not dependent on any other module.

Each of the servlets for the team member website will be described in further detail below.

Module 1—AssignmentStatusList

According to an embodiment of the present disclosure, a functionality of an embodiment of the present disclosure lies in a Java servlet, AssignmentStatusList 1601, that extracts project data from a repository through framework (e.g., data access/encapsulation) classes and then produces HTML that contains tables, text and image elements. These elements are properly sized and aligned such that they produce a complete chart.

This java servlet may generate an HTML page which contains a drop down list of filter criteria and a list of assignments matching the drop down criteria. The list of assignments may include the task name and a bar image for each assignment. The image may describe the assignment's percent complete and status color.

Figure 17:
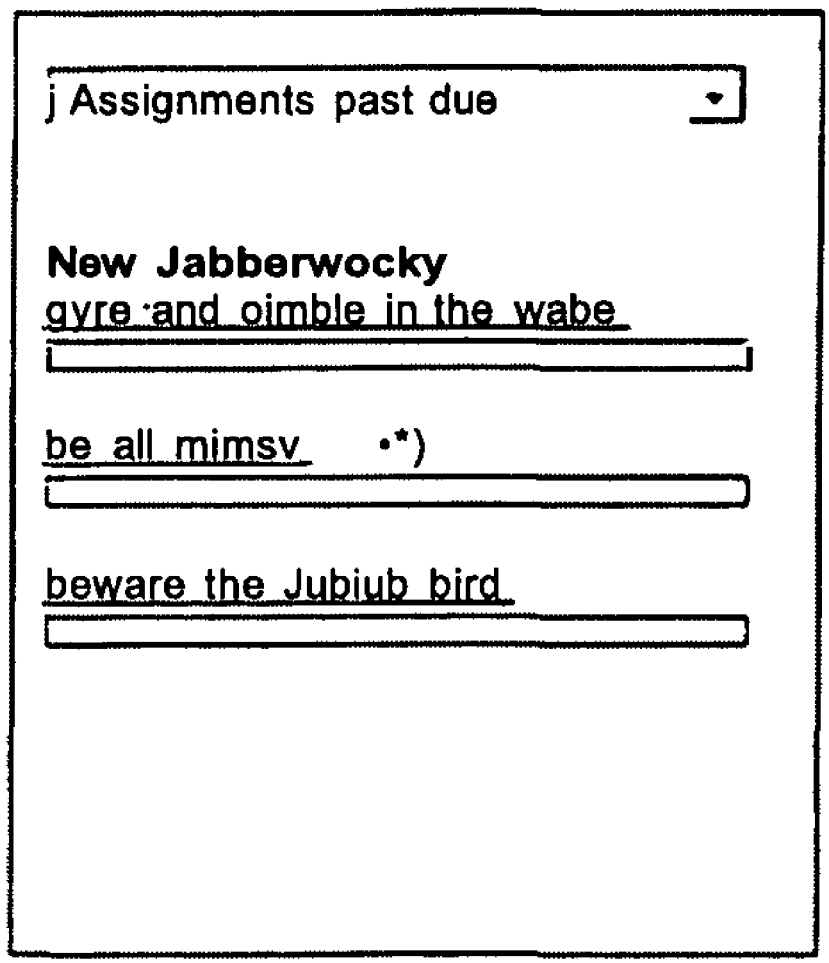
FIG. 17 illustrates an HTML output page generated by the AssignmentStatus servlet from a user's perspective, according to an embodiment of the present disclosure.

The assignments in the list may match the filter criteria in the drop down list. Where the assignments are not "done" and do not have an actual finish date appearing in the list, the available filter criteria may be the following: Assignments Past Due (filterTypeID=1), Assignments Due This Week (filterTypeID=2), Assignments To Start This Week (filterTypeID=3), All Unfinished Assignments (filterTypeID=4). The "Assignments Past Due" filter may be the default item in the list and includes assignments that have a scheduled finish or baseline finish in the past. The "Assignments Due This Week" filter may include assignments that have a scheduled finish date that falls on a date within the current week (depends on the 'week ends on' system parameter). The "Assignments To Start This Week" filter includes assignments that have a scheduled start that falls on a date within the current wee (depends on the 'week ends on' system parameter). The "All Unfinished Assignments" filter includes all unfinished assignments for the resource. FIG. 17 illustrates an HTML output page generated by the AssignmentStatusList module 1601 from a user's perspective, according to an embodiment of the present disclosure.

The AssignmentStatusList module 1601 may produce HTML output based on the parameters that are submitted to it. The parameters may include:

resCode—The user name for the resource assignments that are being listed. If null, a "resource not found error message may be displayed.

imgHeight—The height of the images to be requested. The default value may be 14.

imgWidth—The width of the images to be requested. The default value may be 200.

imgBGColor—The hex code (e.g., #FFFFFF) for the background color of the images. The default value may be the hex code for the color white.

barHeight—The height of the bar to be drawn in the image.

fontFace—The font that may be used on the images. The default may be Verdana.

locale—The java locale code (e.g., en_US) for the locale to use for formatting dates, etc. The default may be the system default.

dayRangeWarn—The number of days an assignment may be late before the system goes into warning severity. This value may be set directly from system parameters.

dayRangeCrit—The number of days after dayRangeWarn that a project may be late before it goes to overdue severity. This value may be calculated from system parameters.

targetFrame—The name of the frame to target when a link is clicked. This may serve as an external interface to other modules.

Module 2—AssignmentStatus

According to an embodiment of the present disclosure, a functionality of an embodiment of the present disclosure lies in a Java servlet, AssignmentStatus 1602, that extracts project data from a repository through framework (e.g., data access/encapsulation) classes and then produces HTML that contains tables, text and image elements. These elements are properly sized and aligned such that they produce a complete chart.

Figure 18:
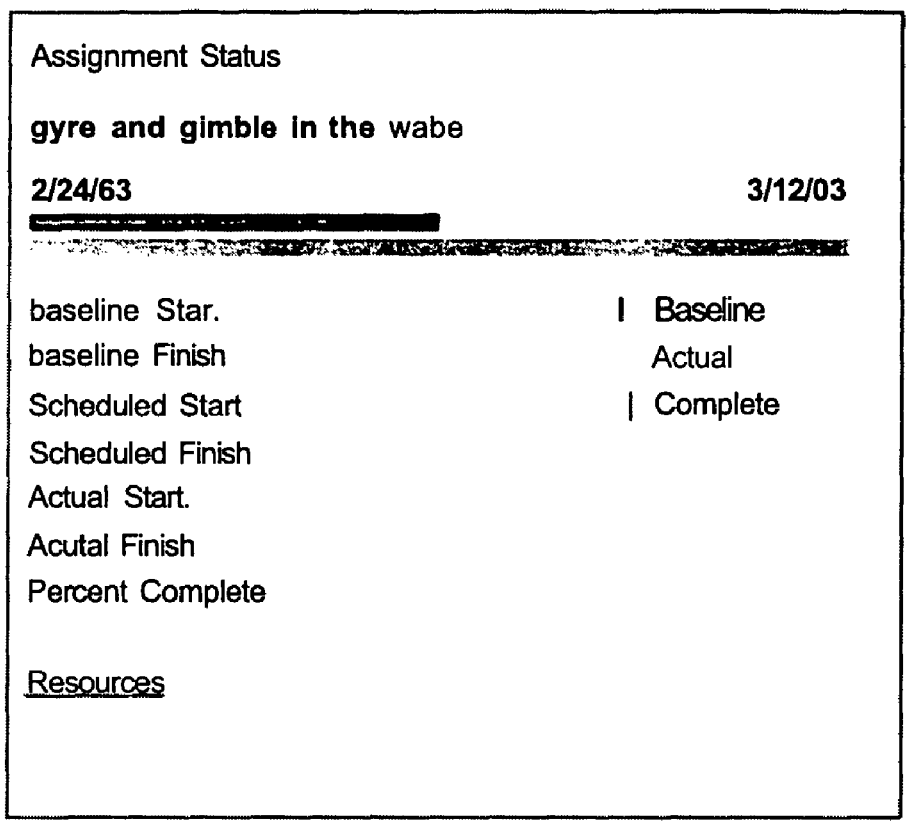
FIG. 18 shows an HTML output page generated by the AsgnResourceStatusList servlet from a user's perspective, according to an embodiment of the present disclosure.

This java servlet may generate an HTML page which contains the basic stats for an assignment. This includes Baseline Start, Baseline Finish, Scheduled Start, Scheduled Finish, Actual Start and Actual Finish. A link may be provided to a list of resources, allowing a user to drill down to a list of resources assigned to the related task. A GantAsgnCompleteImage may also be provided for the assignment. FIG. 18 illustrates an HTML output page generated by the AssignmentStatus module 1602 from a user's perspective, according to an embodiment of the present disclosure.

The AssignmentStatus module 1602 may produce HTML output based on the parameters that are submitted to it. The parameters may include:

projID—The ID of the project for the assignment to show. If the value is null, an error will be displayed.

asgnID—The ID of the assignment to show.

imgHeight—The height of the images to be requested. The default value may be 50.

imgWidth—The width of the images to be requested. The default value may be 350.

imgBGColor—The hex code (e.g., #FFFFFF) for the background color of the images. The default may be the hex code for the color white.

fontFace—The font to use on the images. The default may be Verdana.

locale—The java locale code (e.g., en_US) for the locale to use for formatting dates, etc. The default may be the system default.

navHdrTyp—The code specifying what, if any, navigation header to use. For example, for the Team Member Website, the code might be "asgnStatus".

Module 3—AsgnResourceStatusList

According to an embodiment of the present disclosure, another functionality of an embodiment of the present disclosure lies in a Java servlet, AsgnResourceStatusList 1605, that extracts project data from a repository through framework (e.g., data access/encapsulation) classes and then produces HTML that contains tables, text and image elements.

Figure 19:
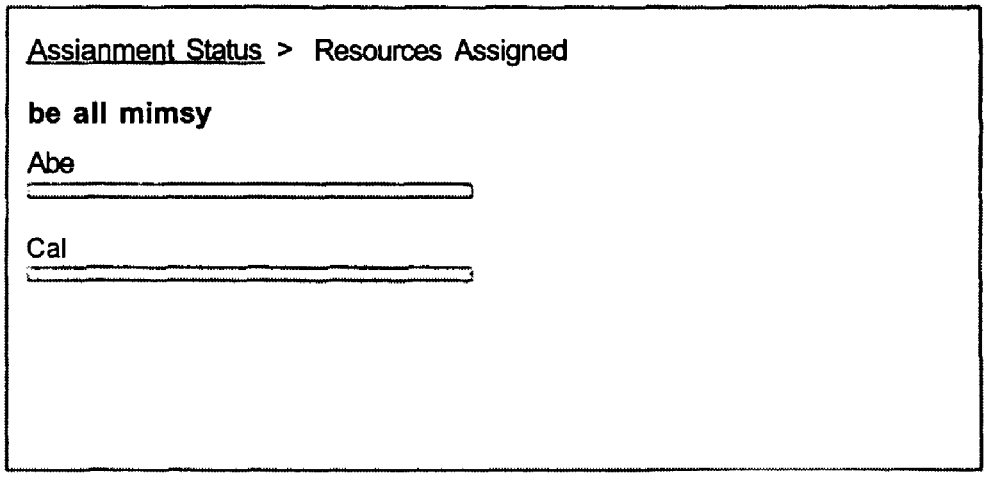
FIG. 19 shows an HTML output page generated by the AsgnResourceStatusList module from a user's perspective, according to an embodiment of the present disclosure.

This java servlet may generate an HTML page that contains a list of resources that are assigned to a given assignment. A resource name, resource code and percent complete bar image may be displayed. FIG. 19 illustrates an HTML output page generated by the AsgnResourceStatusList module 1605 from a user's perspective, according to an embodiment of the present disclosure.

The AsgnResourceStatusList module 1605 may produce HTML output based on the parameters that are submitted to it. The parameters may include:

projID—The ID of the project of the task to show. If null, an error will be displayed.

taskID—The ID of the task to show dayRangeWarn—The number of days a task may be late before the system goes to warning severity. This value may be set directly from system parameters.

dayRangeCrit—The number of days after dayRangeWarn that a task may be late before it goes to overdue severity. This value may be calculated from the system parameters.

navHdrTyp—The code specifying what, if any, navigation header type to use. For example, the code may be "asgnStatus".

Module 4—ColorBarImageServlet

See description in Organization Website section.

Module 5—GantTaskPctCompleteImageServlet

See description in Organization Website section.

Framework

A framework may be provided to handle the many elements of "behind the scenes" work, including, database access, data encapsulation, data validation, etc.

According to an embodiment of the present disclosure, the majority of web screens in the project management application may utilize at least one "gateway" module to initially handle the requests from a client. The gateway may then pass along requests to other modules to handle creating the content based on a code that is submitted with the request. The gateway may then join together the responses from all the modules and return the content to the client as one HTML document. If an error occurs, a separate error page may be displayed.

Figure 20:
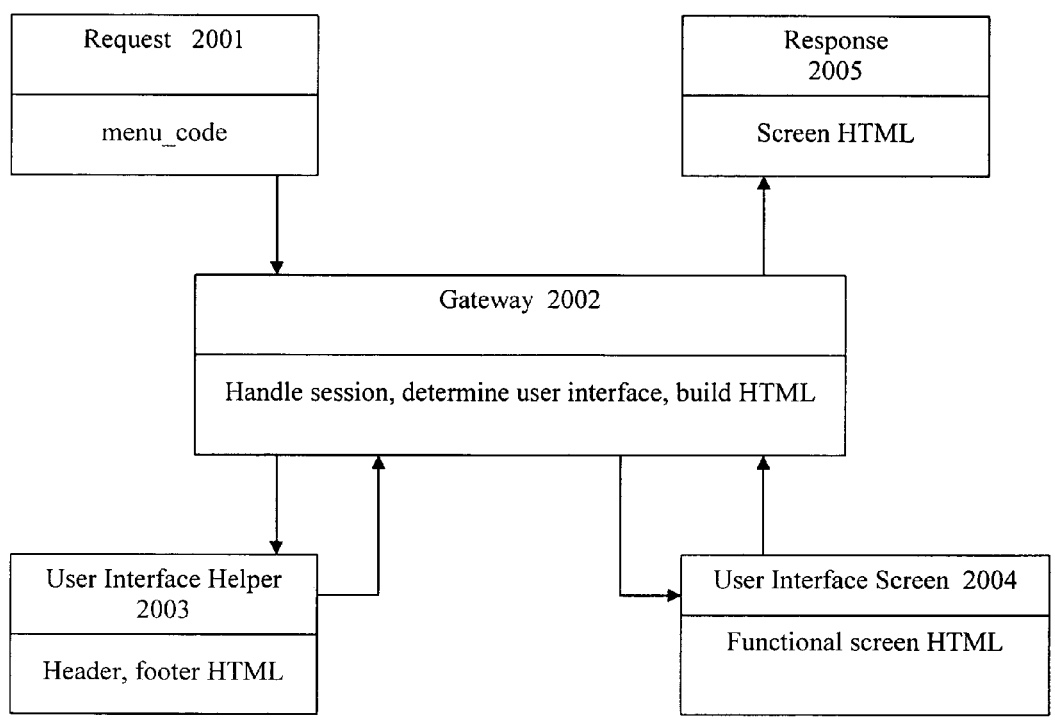
FIG. 20 shows a block diagram illustrating gateway architecture, according to an embodiment of the present disclosure.

The gateway provides standardized methods for connecting the pieces of the entire application. FIG. 20 is a block diagram illustrating the gateway architecture, according to an embodiment of the present disclosure. Each component built to work with the gateway 2002 may have at least two specific methods that the gateway 2002 may use to interface with the component, for example, "doheader" and doProcess" methods. A request 2001 may be received by gateway 2002 and forwarded to the user interface helper 2003. The user interface helper 2003 may return all the HTML the gateway 2002 may need in order to package into a standard skeleton framework of an HTML page to produce the final composite HTML user interface screen 2004 which the gateway may pass as the response 2005.

Figure 21:
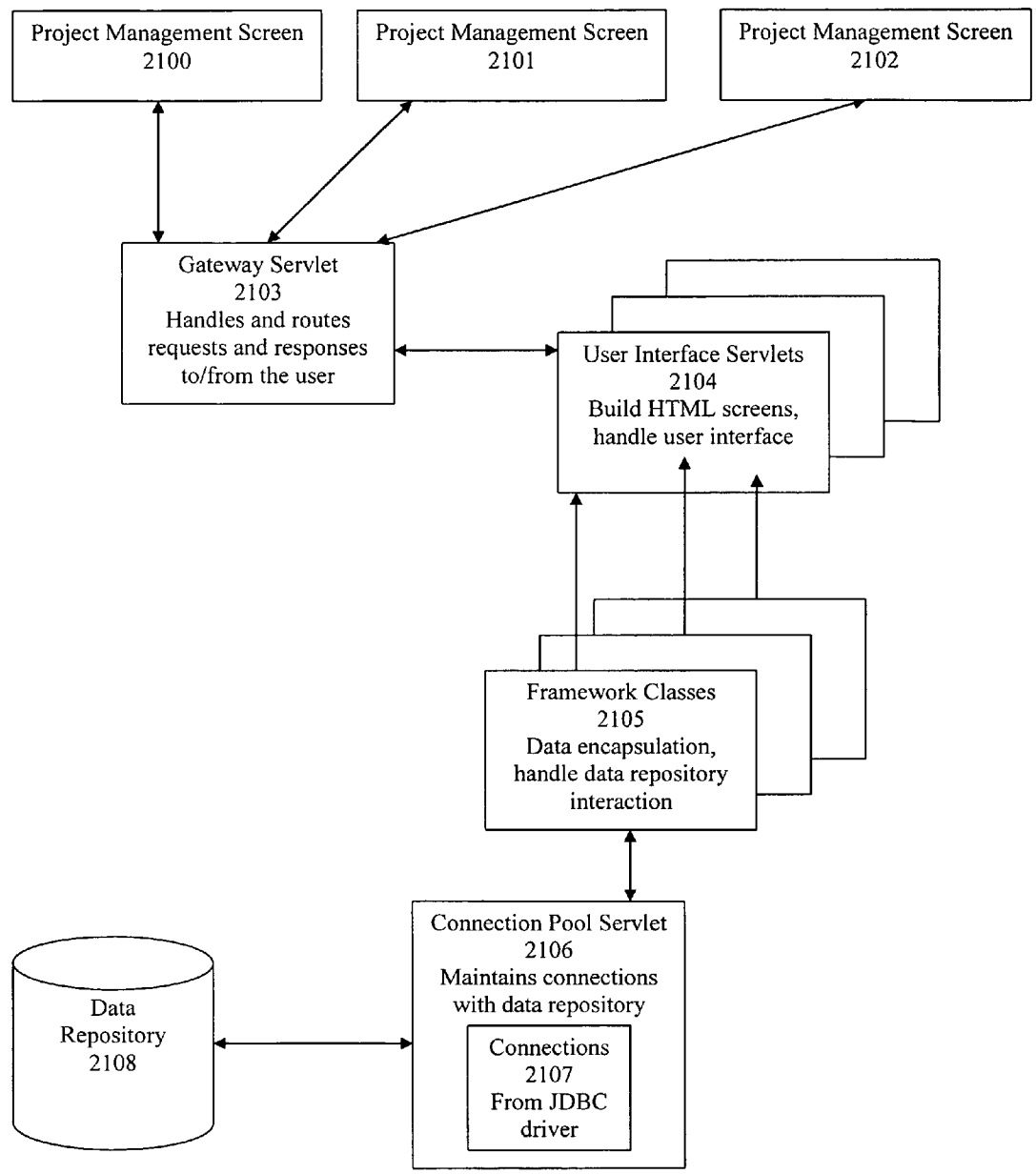
FIG. 21 shows a block diagram illustrating a project management application incorporating the gateway architecture, according to an embodiment of the present disclosure.

FIG. 21 is a block diagram illustrating a project management application incorporating the gateway architecture, according to an embodiment of the present disclosure. A connection pool servlet 2106 may maintain connections 2107 with a data repository 2108. The connection pool servlet 2106 may provide the data from the data repository 2108 to one or more framework classes 2105 that handle data encapsulation and data repository interaction. The framework classes 2105 provide the data to one or more user interface servlets 2104 that build HTML screens. The user interface servlets 2104 interact with the gateway servlet 2103 that may handle and route requests to and from the project management screens 2100-2102.

Database operations may be handled in one set of objects (for example, POCDbObject, dbHandler, etc.). These objects may handle the connection pool, JDBX connections, statements and transactions. The base class in the framework may be POCObject. All other classes in the framework may be extended from POCObject.

Resource bundles may handle internalization of text displayed to a user. All text strings displayed may be stored in the resource bundle. At runtime, the appropriate resource bundle may be used based on the locale setting by passing the locale in the request for the bundle's string. A locale may be dependent upon a setting in a pmi.xml file. The resource bundle may have the correct name for the locale. For example, the locale may be in the following hierarchy in the pmi.xml file:

```
<MPC>
    <server>
        <locale>localeCode</locale>
    </server>
</MPC>
```

The locale may be specified in the pmi.xml file in the correct format. A java locale may be specified by a series of codes, each more specific, separated by underscores. For example, the US English locale is en_US, the German (Euro) local is en_DE_EURO, etc. In addition, each locale's resource bundle may not be completely filled out. There may be a few items that are included in each bundle (for example, the date format). Any items that may not be included in a specified locale may be picked up from a default resource bundle.

Error handling may be centralized in the gateway servlet. Low-level errors may be caught where they occur and may be passed "up the chain" to the gateway. The information in the errors may be two-fold. One piece of descriptive information may be for internal logging to an error log. There may also be an error code that may translate to an error message in another resource bundle. The message can be translated for display based on the locale setting of the current user. Handling errors in the gateway servlet may provide one single place for error handling and display.

Connection pools may be used in order to minimize the amount of time it may take to establish connections with the database. The connection pool may establish a group of connections to the database. These connections may wait in the connection pool until they are needed by an application. At that time the connection is used by the application (for example, to run a query, update, etc.) and then may be returned to the connection pool to be reused. According to an embodiment of the present disclosure, the connection pool may have a maximum number of connections that may be allowed in the pool. For example, the connection pool may start with eight connections and if more connections are needed in the pool, the pool may automatically add new connections until it reaches the maximum number of connections. For example, eight to sixteen connections in the pool may be ample for handling a normal load. The connection pool may also automatically close unused connections and re-establish new connections after a predetermined period of time has expired. This refreshing of the connection pool may be used to handle orphaned connections and/or cursors. The connection pool itself may be instantiated in its own servlet, for example, ConPoolServer (may be preloaded by the servlet engine), as a POCDbObject member variable. The pool may be shared through a static variable in POCDbObject which dbHandler is extended from. According to another embodiment of the present disclosure, information may be displayed on the connection pool itself.

Data (for example, database rows) may be kept in objects. Object classes may encapsulate the actual data. For example, information pertaining to resources may be kept in a resource object. These objects may allow access to the data through various get/set functions. This separates the database schema from the use of the data objects and the information that they contain (for example, the data). For example, simple types of objects (such as long, int, etc.) may be kept internally in their Object class equivalents. Therefore, a long member variable should, instead be a Long initialized to null.

The data objects may be created and filled with information from the database by specific handler objects. Handler objects may contain SQL for creating object class instances, initializing object class instances, adding new objects (rows) to the database, and/or validating existing objects' fields, etc. For example, a resource object may be created by a resource handler object, ResourceHandler.getResource( ). The handlers may contain the SQL necessary for appropriate queries to the database. Therefore, by using the objects, the data may be uniform throughout the user interface pieces and the user interface pieces may not be directly tied to the database schema.

The handler classes may contain SQL to perform database actions. The table names and the field names may not be hard-coded in each string and may be contained in classes as statically defined strings. These classes kept the table and field names used by the framework in one place.

Validation functions may contain the logical rules and business rules to ensure that a value of a field is valid. The handler classes may handle data validation. Each of the user interface servlets may be able to use the handler classes to validate the data and display v validation messages as appropriate without each one duplicating the code to do the validation. The validation functions may each validate one property, for example, validateName(myName). The validation functions may return an error code (for example, a string) representing the appropriate error message if the value is not valid or a no error string if the value is valid. The strings may be defined in a class, for example, POCErrorsKeys class for uniform use throughout the framework. For example, the class POCKeys and the classes that extend from it (for example, POCErrorsKeys, POCTextKeys) may hold static definitions of strings that are used throughout the code. These strings may be key values for the resource bundles. By using a key, the proper display text may easily be retrieved from an associated resource bundle.

A user code may be passed in from the project management application and passed on to each user interface servlet. This may be done by including the user code as a variable URL parameter for the links published in the project management application for the project management application screens.

Collections in the framework may be implemented through for example, a POCObjectList and classes extended from it. POCObjectList may contain methods for iterating through the list and retrieving items from the list as well as adding/removing items from the list. Subclasses may be used for specific types of lists (for example, ResourceList). These specific lists, in addition to being safe, may have special methods for finding items in a list based on an object's members. For example, ProjectList.findProject(id) may search the list for a project with the specified ID and may set it as the current object.

Figure 22:
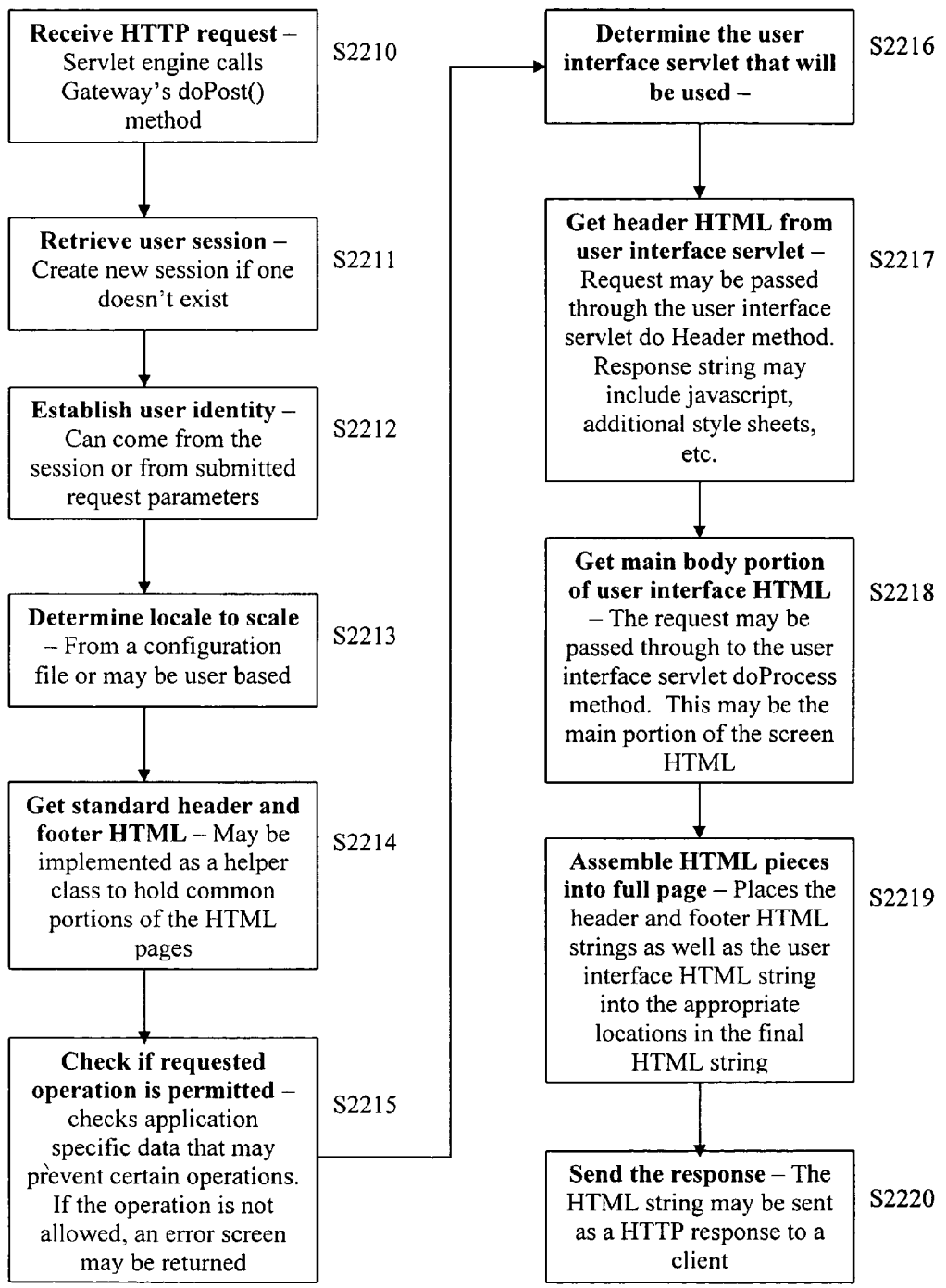
FIG. 22 shows a flow chart illustrating the operational flow for a gateway implementation, according to an embodiment of the present disclosure.

FIG. 22 is a flow chart illustrating the operational flow for a gateway implementation, according to an embodiment of the present disclosure. An HTTP request is received (Step S2210) and the user session is retrieved (Step S2211). The user identity may be established by the user session or from submitted request parameters (Step S2212). The locale to use may be determined from the configuration file or it may be user based (Step S2213). The standard header and footer HTML may be obtained (Step S2214). This may be implemented as a "helper" class to hold common portions of the HTML pages. The system may check to see if the requested operation is permitted (Step S2215) by checking application specific data that may prevent certain operations. For example, editing or deleting a project while a Create Time operation is in progress may not be allowed. If the operation is not allowed, an error screen may be returned. The system may determine which user interface servlet may be used by comparing a submitted menu code against known codes (Step S2216). The associated servlet class may be determined. If the menu code is unknown, an error screen may be returned. The header HTML may be obtained from the user interface servlet (Step S2217). The request may be passed through to the user interface servlet doHeader method. The response string may include JavaScript, additional style sheets, etc. The main body portion of the user interface HTML may be obtained (Step S2218). The request may be passed through to the user interface servlet doProcess method and may be the main portion of the screen HTML. The HTML pieces are assembled into a full page (Step S2219) by placing the standard header and footer HTML strings as well as the user interface HTML string into their appropriate locations in the final HTML string. The response may then be sent (Step S2220) as an HTTP response to a client.

According to an embodiment of the present disclosure, instead of simple codes and standard HTTP request parameters, XML documents may be used for requests. For example, abstract documents such as XML may be used for transferring data internally, rather than HTML. The gateway may communicate with other servlets using a standard HTTP connection between them instead of calling the methods directly.

User Parameters

According to an embodiment of the present disclosure, a portal component may be delivered that may allow individual users to customize the color thresholds for their Project Gantt bars and To Do Task List Gantts. These settings may apply to individual users and allow them to personalize their own environment. The user parameters may be saved to the data repository in a user preferences table. The user parameters functionality may consist of one user interface screen. If a user chooses to, they may visit the User Parameters User Interface and save custom preferences for themselves. Otherwise, if there are no custom parameters saved, they may operate with default values. The user parameters functionality may be implemented in three classes, each of which can be described in further detail below.

UserParams.java

The UserParams.java class may handle the generation of the user interface HTML. The page may have settings for two user parameters, for example, "warning days tolerance range" and "critical days tolerance range." These settings may be used by the team member and organizational websites to determine the day ranges for severity. Each of the tolerance ranges may have a drop down box where a user can select a number of days and a drop down box to select "before" or "after". The day range number drop down boxes may have the following selectable options: 0 through 31, 35, 42, 49, 56, 60, 90. These values combined may indicate that the related range starts X days [before/after] the target date. If "before" is selected in the drop down, the day number may be stored internally as a negative number. To draw the screen, the following parameter may be submitted in the request: resCode (user name for whom we are editing user parameters).

This module may be dependent on the UserParameterhandler and UserParameters classes.

UserParameters.java

This class may be used to encapsulate the user parameter data for a user. For example, the UserParameters class may have the following public methods: setUserName( ); setRptDaysCritical( ); setRptDaysWarning( ); getUserName( ); getRptDaysCritical; and getRptDaysWarning; etc.

UserParameterhandler.java

This class may handle adding, updating, and retrieving user parameter data and populating user parameter objects. It may also handle the data validation for the user parameter data. The getUserParameters method may return a valid UserParameters object (instead of possibly throwing a POCNoObjectException). If a record cannot be found for a user's user parameters, a new record may be created, filled with default values. If a value cannot be found for a particular user parameter, then the default values may be used. For example, the hard-coded defaults may be: Warning day range=7 days after day, and Critical day range=14 days after date. For example, the UserParameterhandler class may have the following public methods: addUserParameters( ); getUserParameters( ); updateUserParameters( ); validateRptCriticalDays( ); validateRptDaysRelative( ); and validateRptWarningDays( ); etc.

According to an embodiment of the present disclosure, users are provided with a visual method of tracking down a problem area within a project. For example, areas of concern can be highlighted in a color, such as red or yellow, to indicate that a problem may exist. Project plans may consist of a hierarchal tree structure and each task may have one or more sub-tasks. The structure can consist of many levels. FIG. 23 is a graphical user interface (GUI) illustrating a hierarchal tree structure, according to an embodiment of the present disclosure.

A task may have many properties associated with it, including its planned start date, its actual start date, etc. Over the life of a project, tasks are progressed as actual work is completed. Top level tasks may be summaries of all the tasks below them. FIG. 24 is a graphical user interface illustrating a gantt bar chart, according to an embodiment of the present disclosure. Using the example shown in FIG. 24, assume the following information is true: The task with the earliest start date is Create Produce Requirements Specification—Feb. 3, 2003 and the task with the latest finish date is Notify Project Team of Project Approval—Mar. 12, 2003. In this example, the planning phase has a start date of Feb. 3, 2003 and a finish date of Mar. 12, 2003 and would not be considered complete until all of the sub-tasks are completed.

According to an embodiment of the present disclosure, a GUI is provided that displays the top levels of a project. Each Gantt bar may be coded in some manner depending on the status of each phase. For example, each Gantt bar may be coded in various shades of a particular color, or color coded using red, yellow, or green. Red may represent a critical condition, yellow may represent a warning phase (for example, it is about to turn critical) and green may represent a phase that needs no attention. Each user may configure the time when the color of each phase may change color. This enables each user to customize their environment. For example, if a first user sets the phases to turn yellow two weeks before a second user, then the first user can get advanced warning of trouble before the second user. Each of the phases may be "drillable", allowing a user to click on the phase and find out what is troubling the phase.

The user may also hover over the links and obtain a quick update on information for that phase, including, for example, the date it was supposed to start, when it was supposed to end, etc. The color coding may be calculated by using an algorithm as follows:

An item may be in warning status if:
(actual start-baseline start>warning tolerance range OR scheduled finish-baseline finish>warning tolerance range) AND the item has not been finished (actual finish is NULL) AND the item has a baseline to compare against.

An item may be in overdue status if:
(actual start-baseline start>critical tolerance range OR scheduled finish-baseline finish>critical tolerance range) AND the item has not been finished (actual finish is NULL) AND the item has a baseline to compare against.

According to an embodiment of the present disclosure, Java servlet technology may be used and may allow for a great degree of flexibility. An image may be customized based on submitted parameters. Given any set of valid parameters, a wide range of images may be generated including banners, timestamps, error messages, decorative text, etc. In addition, a document may be generated as one image.

According to an embodiment of the present disclosure, dynamic image generation may be enabled with text messages. For example, jpeg images may be generated that contain text messages. Such dynamic image generation may be used, for example, for creating images to display an error message to a user when another dynamic image (for example, a Gantt bar) encounters an error and cannot be generated. A font face, font color, background color, and image size for the resulting image may be specified by the user.

There may be two main elements for the dynamic image generation with text messages. The first element may build the image and may be implemented as, for example, a Java class, for example, MessageImage. This class may be responsible for actually creating the image based on submitted parameters. The parameters may include the following:

| | |
|---|---|
| sText | The text that may be displayed in the image. |
| iImageWidth | The width of the resulting image. |
| iImageHeight | The height of the resulting image. |
| iBGColor | The background color (for example, in integer format) of the resulting image. |
| iTextColor | The color of the text (in integer format). |
| iFontSize | The point size of the font to be used. |
| sFontFace | The name of the font to be used. |

Internal default values may be used for any parameters not submitted. The text may default to an empty string. A MessageImage class may check that the text can fit onto the requested image. If it is determined that the text may not fit with the given font and font size, the font size may automatically be reduced until the text fits onto the image, with a minimum font size, for example, of 3.

The image generated by MessageImage class may be returned as a jpeg image in an instance of java.io.ByteArrayOutputStream.

Figure 25:
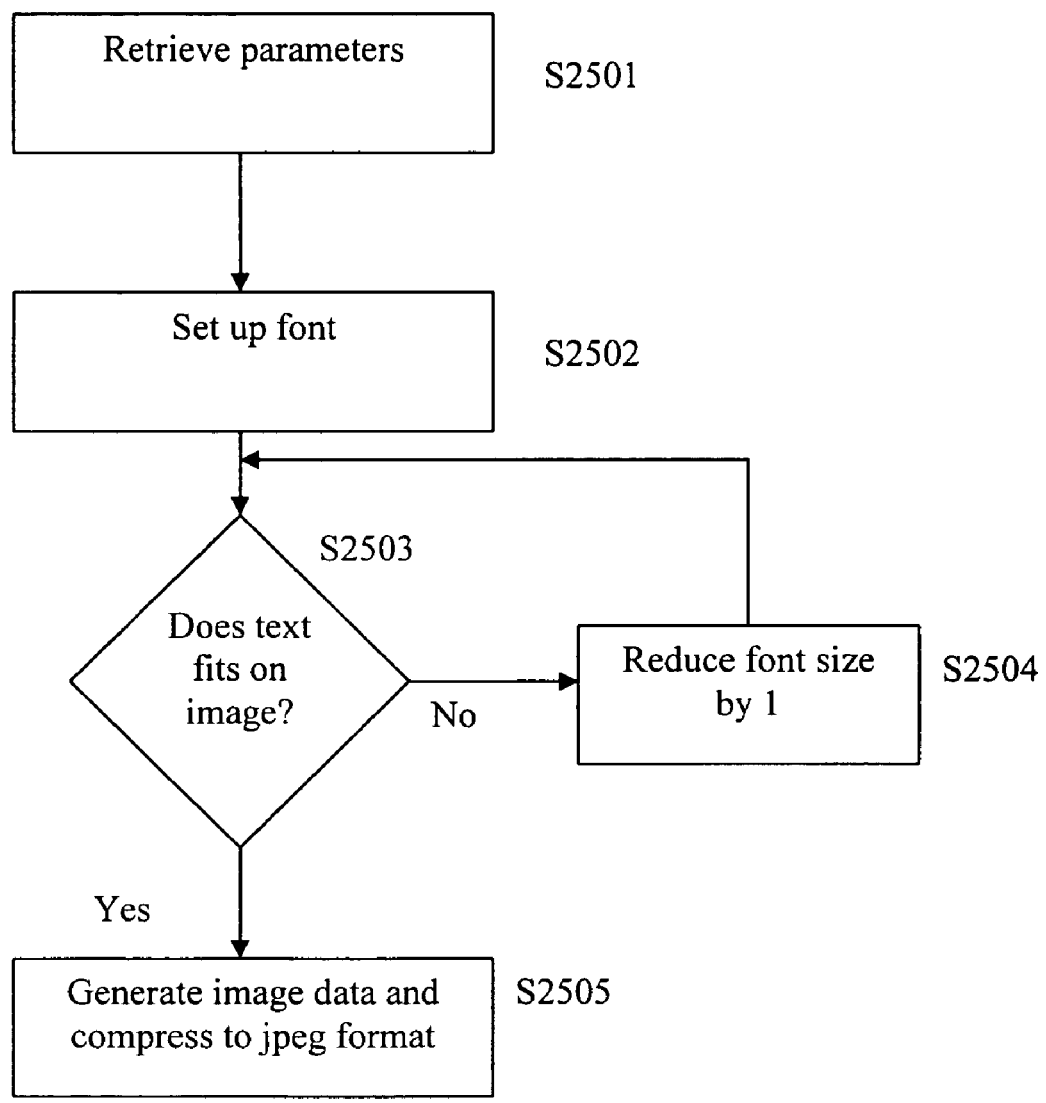
FIG. 25 shows a flow chart illustrating the dynamic generation of an image with a text message, according to an embodiment of the present disclosure.

FIG. 25 is a flow chart illustrating the dynamic generation of an image with a text message, according to an embodiment of the present disclosure. Parameters may be retrieved (Step S2501) and fonts may be set up (Step S2502). It may then be determined whether the text fits on the image (Step S2503). If it is determined that the text does not fit on the image, the font may be reduced by 1 (Step S2504) and it is again determined whether the text fits on the image (Step S2503). The process continues until it is determined that the text fits on the image (Step S2503). However, if it is determined that the text fits on the image, the image data may be generated and compressed into a jpeg format (Step S2505).

According to this embodiment, the MessageImage class may be used in any Java application to generate images, web based or not.

Figure 26:
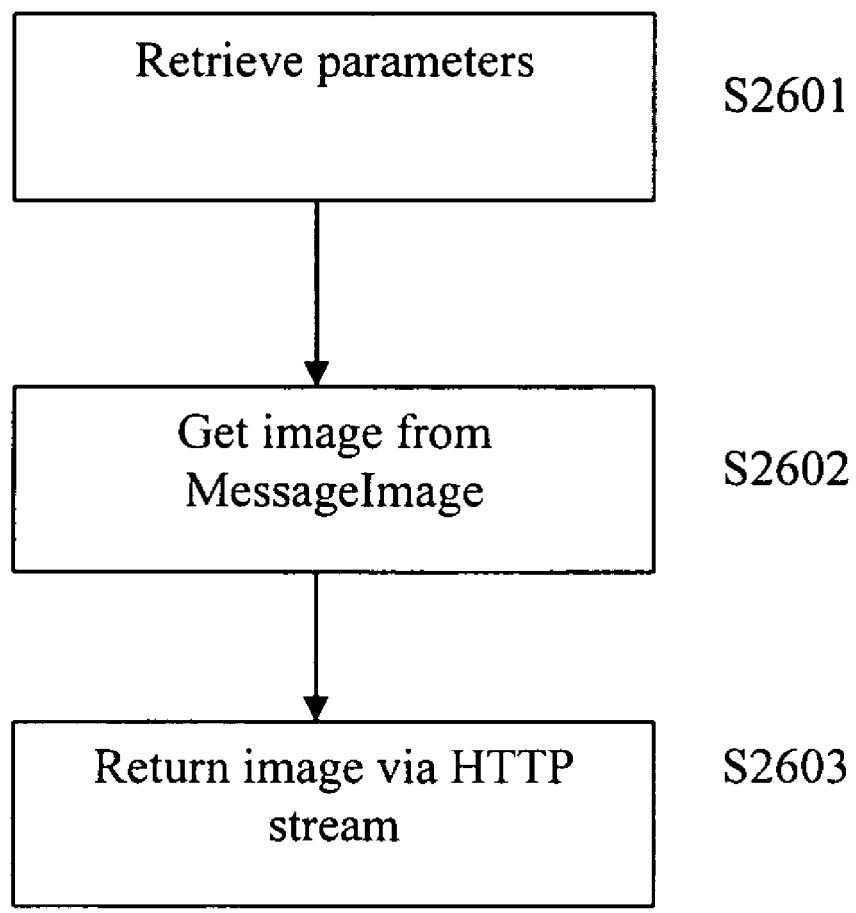
FIG. 26 shows a flow chart illustrating the hooking of a MessageImage to the web, according to an embodiment of the present disclosure.

The second element of this embodiment of the present disclosure is a Java servlet that hooks the MessageImage to the web. It may handle the requests and return the image to a client. FIG. 26 is a flow chart illustrating the hooking of a MessageImage to the web, according to an embodiment of the present disclosure. Parameters may be retrieved (Step S2601) and the image may be obtained (Step S2602). The image may then be returned via an HTTP stream (Step S2603).

There are many different ways of implementing dynamic image generation. For example, preexisting "stock" images may be used to produce a composite image. In addition, enhancing may be used to parse HTML, XML, etc. and produce a wider variety of formatting in the images.

The present disclosure may be conveniently implemented using one or more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional component circuits.

The present disclosure may be implemented to provide similar functionality using a different implementation technology such as, for example, C++, Flash, etc. Additionally, the present system could be implemented by a software tool as a single image rather than a set of HTML that builds the chart. Although many of the embodiments are described herein as utilizing Java, any other form of suitable coding may be implemented as desired. In addition, although various embodiments describe the use of JPEG images, it should be understood that any suitable type of image format may be used as desired.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for dynamic creation of a phase Gantt chart, comprising:
 entering project management data into a repository, the project management data comprising a plurality of tasks of an associated project plan;
 receiving a request from at least one client to obtain the project management data;

generating the phase Gantt chart in response to the received request based on the project management data stored in the repository, the Gantt chart graphically displaying a time relationship between at least one of the plurality of tasks and a total time span of the associated project plan; and linking the Gantt chart to at least one list of tasks that are at risk, a task that is at risk comprising a task that has not been finished and is behind schedule with respect to an identified tolerance range.

2. The method of claim 1, wherein the at least one client has access to a web browser.

3. The method of claim 1, further comprising providing at least one server, wherein the at least one server comprises one or more software applications and a repository server.

4. The method of claim 3, wherein the repository server comprises portal tablespace, project management tablespace, and a repository.

5. The method of claim 3, wherein the software applications comprise a reporting tool application and a project management application.

6. The method of claim 5, wherein the reporting tool application generates one or more reports.

7. The method of claim 6, wherein the reports are an effort expended by project report, a project stage status report, a task status report, a project resources assignments report, a submitted time report, a project status report, a submitted time by project report, and a added tasks by project report.

8. The method of claim 5, wherein the project management application comprises one or more software applications.

9. The method of claim 8, wherein the software applications comprise a client based software application and a portal application, comprising at least one portlet.

10. The method of claim 9, wherein the client based software application processes the project management data by simultaneously entering and retrieving the project management data.

11. The method of claim 9, wherein the portal application provides a personalized view of the project management data for each client.

12. The method of claim 9, wherein a portlet container comprises at least one portlet of the portal application.

13. The method of claim 9, wherein the portlets are a create resource portlet, a resource search portlet, a view resource portlet, a edit resource portlet, a delete resource portlet, a project search portlet, a delete project portlet, a view project portlet, a unlock project portlet, a project management gantt list portlet, a project phases portlet, a tasks at risk portlet, a task status portlet, a tolerance settings portlet, a resource list portlet, a team member to do list portlet, a task details portlet, and a resource list portlet.

14. The method of claim 13, wherein the portlets comprise a GUI, one or more user fields and one or more user links.

15. A method for dynamic creation of a phase Gantt chart, comprising:
entering project management data into a repository;
receiving a request from at least one client to obtain the project management data; and
generating the phase Gantt chart in response to the received request based on the project management data stored in the repository;
wherein the entering step further comprises determining if the project management data already exists in the repository, and entering a name and code if it is determined that the project management data does not exist in the repository; and linking the Gantt chart to at least one list of tasks that are at risk, a task that is at risk comprising a task that has not been finished and is behind schedule with respect to an identified tolerance range.

16. The method of claim 1, wherein the project management data can be filtered for each client based on predetermined criteria.

17. The method of claim 1, wherein the entering, receiving and generating steps are performed by a java servlet.

18. The method of claim 17, wherein a first java servlet generates a user interface that generates HTML for a screen and a second java servlet generates images.

19. The method of claim 17, wherein a java servlet obtains input parameters, gathers project data, outputs javascript data and functions, calculates and outputs a gantt chart, and outputs HTML details.

20. The method of claim 17, wherein the java servlets include a project status list servlet, a project phase status servlet, a at risk task list servlet, a task status servlet, a task resource status list servlet, a color bar image servlet, a gantt task complete image servlet, a assignment status list servlet, a assignment status servlet, and a assignment resource status list servlet.

21. The method of claim 1, wherein the generating step further comprises determining a start and end date; determining an actual time between the start and end date, and assembling in HTML a phase Gantt chart.

22. The method of claim 1, wherein the client can customize the generation of the phase Gantt chart.

23. An apparatus for dynamic creation of a phase Gantt chart, comprising:
a repository for storing project management data;
at least one processor having access to the repository, the at least one processor comprising:
a unit for entering project management data into the repository, the project management data comprising a plurality of tasks of an associated project plan;
a unit for receiving a request from at least one client to obtain the project management data;
a unit for generating the phase Gantt chart in response to the received request based on the project management data stored in the repository, the Gantt chart graphically displaying a time relationship between at least one of the plurality of tasks and a total time span of the associated project plan; and
a unit for linking the Gantt chart to at least one list of tasks that are at risk, a task that is at risk comprising a task that has not been and is behind schedule with respect to an identified tolerance range.

24. The apparatus of claim 23, wherein the at least one client has access to a web browser.

25. The apparatus of claim 23, further comprising access to at least one server, wherein the at least one server comprises one or more software applications and a repository server.

26. The apparatus of claim 25, wherein the repository server comprises portal tablespace, project management tablespace, and a repository.

27. The apparatus of claim 25, wherein the software applications comprise a reporting tool application and a project management application.

28. The apparatus of claim 27, wherein the reporting tool application generates one or more reports.

29. The apparatus of claim 28, wherein the reports are an effort expended by project report, a project stage status report, a task status report, a project resources assignments report, a submitted time report, a project status report, a submitted time by project report, and a added tasks by project report.

30. The apparatus of claim 27, wherein the project management application comprises one or more software applications.

31. The apparatus of claim 30, wherein the software applications comprise a client based software application and a portal application, comprising at least one portlet.

32. The apparatus of claim 31, wherein the client based software application processes the project management data by simultaneously entering and retrieving the project management data.

33. The apparatus of claim 31, wherein the portal application provides a personalized view of the project management data for each client.

34. The apparatus of claim 31, wherein a portlet container comprises at least one portlet of the portal application.

35. The apparatus of claim 31, wherein the portlets are a create resource portlet, a resource search portlet, a view resource portlet, a edit resource portlet, a delete resource portlet, a project search portlet, a delete project portlet, a view project portlet, a unlock project portlet, a project management gantt list portlet, a project phases portlet, a tasks at risk portlet, a task status portlet, a tolerance settings portlet, a resource list portlet, a team member to do list portlet, a task details portlet, and a resource list portlet.

36. The apparatus of claim 35, wherein the portlets comprise a GUI, one or more user fields and one or more user links.

37. The apparatus of claim 23, wherein the means for entering further comprises means for determining if the project management data already exists in the repository, and means for entering a name and code if it is determined that the project management data does not exist in the repository.

38. The apparatus of claim 23, wherein the project management data can be filtered for each client based on predetermined criteria.

39. The apparatus of claim 23, wherein a java servlet comprises the means for entering, receiving and generating.

40. The apparatus of claim 39, wherein a first java servlet generates a user interface that generates HTML for a screen and a second java servlet generates images.

41. The apparatus of claim 39, wherein a java servlet obtains input parameters, gathers project data, outputs javascript data and functions, calculates and outputs a gantt chart, and outputs HTML details.

42. The apparatus of claim 39, wherein the java servlets include a project status list servlet, a project phase status servlet, a at risk task list servlet, a task status servlet, a task resource status list servlet, a color bar image servlet, a gantt task complete image servlet, a assignment status list servlet, a assignment status servlet, and a assignment resource status list servlet.

43. The apparatus of claim 23, wherein the means for generating further comprises means for determining a start and end date; means for determining an actual time between the start and end date, and means for assembling in HTML a phase Gantt chart.

44. The apparatus of claim 23, wherein the client can customize the generation of the phase Gantt chart.

45. A computer storage medium including computer executable code for dynamic creation of a phase Gantt chart, comprising:
code for entering project management data into a repository, the project management data comprising a plurality of tasks of an associated project plan;
code for receiving a request from at least one client to obtain the project management data;
code for generating the phase Gantt chart in response to the received request based on the project management data stored in the repository, the Gantt chart graphically displaying a time relationship between at least one of the plurality of tasks and a total time span of the associated project plan; and
code for linking the Gantt chart to at least one list of tasks that are at risk, a task that is at risk comprising a task that has not been finished and is behind schedule with respect to an identified tolerance range.

46. The computer storage medium of claim 45, wherein the at least one client has access to a web browser.

47. The computer storage medium of claim 45, further comprising code for providing access to at least one server, wherein the at least one server comprises one or more software applications and a repository server.

48. The computer storage medium of claim 47, wherein the repository server comprises portal tablespace, project management tablespace, and a repository.

49. The computer storage medium of claim 47, wherein the software applications comprise a reporting tool application and a project management application.

50. The computer storage medium of claim 49, wherein the reporting tool application generates one or more reports.

51. The computer storage medium of claim 50, wherein the reports are a effort expended by project report, a project stage status report, a task status report, a project resources assignments report, a submitted time report, a project status report, a submitted time by project report, and a added tasks by project report.

52. The computer storage medium of claim 49, wherein the project management application comprises one or more software applications.

53. The computer storage medium of claim 52, wherein the software applications comprise a client based software application and a portal application, comprising at least one portlet.

54. The computer storage medium of claim 53, wherein the client based software application processes the project management data by simultaneously entering and retrieving the project management data.

55. The computer storage medium of claim 53, wherein the portal application provides a personalized view of the project management data for each client.

56. The computer storage medium of claim 53, wherein a portlet container comprises at least one portlet of the portal application.

57. The computer storage medium of claim 53, wherein the portlets are a create resource portlet, a resource search portlet, a view resource portlet, a edit resource portlet, a delete resource portlet, a project search portlet, a delete project portlet, a view project portlet, a unlock project portlet, a project management gantt list portlet, a project phases portlet, a tasks at risk portlet, a task status portlet, a tolerance settings portlet, a resource list portlet, a team member to do list portlet, a task details portlet, and a resource list portlet.

58. The computer storage medium of claim 57, wherein the portlets comprise a GUI, one or more user fields and one or more user links.

59. The computer storage medium of claim 45, wherein the code for entering step further comprises code for determining if the project management data already exists in the repository and code for entering a name and code if it is determined that the project management data does not exist in the repository.

60. The computer storage medium of claim 45, wherein the project management data can be filtered for each client based on predetermined criteria.

61. The computer storage medium of claim 45, wherein the code for entering, receiving and generating is performed by a java servlet.

62. The computer storage medium of claim 61, wherein a first java servlet generates a user interface that generates HTML for a screen and a second java servlet generates images.

63. The computer storage medium of claim 61, wherein a java servlet obtains input parameters, gathers project data, outputs javascript data and functions, calculates and outputs a gantt chart, and outputs HTML details.

64. The computer storage medium of claim 61, wherein the java servlets include a project status list servlet, a project phase status servlet, a at risk task list servlet, a task status servlet, a task resource status list servlet, a color bar image servlet, a gantt task complete image servlet, a assignment status list servlet, a assignment status servlet, and a assignment resource status list servlet.

65. The computer storage medium of claim 45, wherein the code for generating further comprises code for determining a start and end date; code for determining an actual time between the start and end date, and code for assembling in HTML a phase Gantt chart.

66. The computer storage medium of claim 45, wherein the client can customize the generation of the phase Gantt chart.

* * * * *